(12) United States Patent
Fujiwara et al.

(10) Patent No.: US 9,035,476 B2
(45) Date of Patent: *May 19, 2015

(54) POWER GENERATING DEVICE

(75) Inventors: Hideki Fujiwara, Kitakatsuragi-gun (JP); Masaaki Ohtsuki, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 186 days.

This patent is subject to a terminal disclaimer.

(21) Appl. No.: 13/606,695

(22) Filed: Sep. 7, 2012

(65) Prior Publication Data

US 2013/0062886 A1    Mar. 14, 2013

(30) Foreign Application Priority Data

Sep. 12, 2011 (JP) ................................. 2011-198354
Sep. 12, 2011 (JP) ................................. 2011-198380
Nov. 21, 2011 (JP) ................................. 2011-253598
Mar. 28, 2012 (JP) ................................. 2012-073987

(51) Int. Cl.
| | |
|---|---|
| *H02K 7/10* | (2006.01) |
| *F03D 11/02* | (2006.01) |
| *F16D 7/10* | (2006.01) |
| *F16D 27/115* | (2006.01) |
| *F16D 41/067* | (2006.01) |
| *F16D 43/208* | (2006.01) |

(Continued)

(52) U.S. Cl.
CPC ......... *F03D 11/02* (2013.01); *F05B 2260/4031* (2013.01); *Y02E 10/722* (2013.01); *F16D 7/10* (2013.01); *F16D 27/115* (2013.01); *F16D 41/067* (2013.01); *F16D 43/208* (2013.01); *F16D 43/216* (2013.01); *F16D 43/22* (2013.01); *F16D 47/04* (2013.01); *F16D 2300/18* (2013.01)

(58) Field of Classification Search
USPC ........................................ 290/38 R, 4 R, 1 C
See application file for complete search history.

(56) References Cited

U.S. PATENT DOCUMENTS

| | | |
|---|---|---|
| 3,469,473 A | 9/1969 | Forster et al. |
| 4,461,957 A | 7/1984 | Jallen |

(Continued)

FOREIGN PATENT DOCUMENTS

| | | |
|---|---|---|
| DE | 10 2009 004 991 A1 | 7/2010 |
| DE | 20 2010 012 597 U1 | 2/2011 |

(Continued)

OTHER PUBLICATIONS

U.S. Appl. No. 14/041,078, filed Sep. 30, 2013.

(Continued)

*Primary Examiner* — Tulsidas C Patel
*Assistant Examiner* — Viet Nguyen
(74) *Attorney, Agent, or Firm* — Oliff PLC

(57) ABSTRACT

A power generating device includes an input rotor that is provided to an output shaft of speed up gears so as to be capable of rotating together with the output shaft, an output rotor that is provided to a drive shaft of a generator so as to be capable of rotating together with the drive shaft, and a one-way clutch that is disposed between the input rotor and the output rotor. The one-way clutch connects the input rotor with the output rotor so as to rotate together with the input rotor and the output rotor when the rotation speed of the input rotor exceeds the rotation speed of the output rotor, and the one-way clutch is configured to release the connection between the input rotor and the output rotor when the rotation speed of the input rotor falls below the rotation speed of the output rotor.

14 Claims, 16 Drawing Sheets

(51) Int. Cl.
    *F16D 43/21*     (2006.01)
    *F16D 43/22*     (2006.01)
    *F16D 47/04*     (2006.01)

(56) References Cited

U.S. PATENT DOCUMENTS

| | | | |
|---|---|---|---|
| 4,464,579 | A | 8/1984 | Schwarz |
| 4,613,763 | A | 9/1986 | Swansen |
| 6,856,042 | B1 | 2/2005 | Kubota |
| 2008/0284168 | A1 | 11/2008 | Arduini |
| 2009/0278361 | A1* | 11/2009 | Okubo et al. ................. 290/1 C |
| 2010/0294585 | A1* | 11/2010 | Wolff et al. ................... 180/298 |
| 2012/0020792 | A1 | 1/2012 | Frank |
| 2012/0045335 | A1* | 2/2012 | Heidenreich et al. ..... 416/170 R |
| 2012/0201679 | A1 | 8/2012 | Heidenreich et al. |
| 2013/0278100 | A1* | 10/2013 | Fujiwara ........................ 310/90 |
| 2013/0283949 | A1* | 10/2013 | Fujiwara ........................ 74/405 |
| 2014/0090945 | A1* | 4/2014 | Fujiwara et al. ......... 192/45.001 |

FOREIGN PATENT DOCUMENTS

| | | |
|---|---|---|
| EP | 2 302 257 A2 | 3/2011 |
| JP | A-6-307327 | 11/1994 |
| JP | A-2006-250034 | 9/2006 |
| JP | A-2007-232186 | 9/2007 |
| JP | A-2013-238309 | 11/2013 |
| SU | 1 574 899 A1 | 6/1990 |
| WO | WO 2005/012763 A1 | 2/2005 |
| WO | WO 2012/023994 A1 | 2/2012 |

OTHER PUBLICATIONS

Extended European Search Report issued in European Application No. 12183632.4 dated Jan. 11, 2013.
Extended European Search Report issued in European Patent Application No. 13 18 7006.5 dated Mar. 21, 2014.
Sep. 9, 2014 Office Action issued in U.S. Appl. No. 14/041,078.
Jan. 23, 2015 Office Action issued in U.S. Appl. No. 14/041,078.

* cited by examiner

POWER GENERATING DEVICE

INCORPORATION BY REFERENCE

The disclosure of Japanese Patent Application No. 2011-198354 filed on Sep. 12, 2011 including the specification, drawings and abstract is incorporated herein by reference in its entirety. The disclosure of Japanese Patent Application No, 2011-253598 filed on Nov. 21, 2011 including the specification, drawings and abstract is incorporated herein by reference in its entirety. The disclosure of Japanese Patent Application No. 2012-073987 filed on Mar. 28, 2012 including the specification, drawings and abstract is incorporated herein by reference in its entirety.

BACKGROUND OF THE INVENTION

1. Field of the Invention

The present invention relates to a power generating device in which rotation of a main shaft by external force is increased in speed with speed up gears to drive a generator.

2. Description of the Related Art

The speed up gears are used for a wind power generating device in order that wind force is received with blades to rotate the main shaft that is connected to the blades and the rotation of the main shaft is increased in speed to drive the generator. As shown in FIG. 16, the speed up gears 202 include a planetary gear mechanism 203 that receives the rotation of a main shaft 200 to increase the speed, a high-speed gear mechanism 204 that receives the rotation of which the speed is increased by the planetary gear mechanism 203 and further increases the speed of the rotation, and an output shaft 205 that outputs running torque of the high-speed gear mechanism 204.

The planetary gear mechanism 203 is constructed such that when an input shaft 203a that is coupled to the main shaft 200 so as to be capable of rotating together rotates; a planet carrier 203b also rotates, and therefore a sun gear 203d rotates with increased speed through a planet gear 203c, and the rotation is transmitted to a low-speed shaft 204a of the high-speed gear mechanism 204. The high-speed gear mechanism 204 is constructed to rotate an intermediate shaft 204d with increased speed through the low-speed gear 204b and a first intermediate gear 204c when the low-speed shaft 204a rotates and further rotate the output shaft 205 with increased speed through a second intermediate gear 204e and a high-speed gear 204f. As respective bearings for rotatably supporting the low-speed shaft 204a, the intermediate shaft 204d, and the output shaft 205 of the speed up gears 202, roller bearings 206 to 211 are frequently used (see Japanese Patent Application Publication No. 2007-232186 (JP 2007-232186 A), for example).

In addition, a wind power generating device that receives wind force with blades to rotate the main shaft which is connected to the blades and increases the speed of the rotation of the main shaft to drive the generator is known. The speed up gears for increasing the rotation of the main shaft in speed includes, as shown in FIG. 16 for example, a planetary gear mechanism 203 that increases the speed of the rotation which is received from a main shaft 200, a high-speed gear mechanism 204 that further increases the speed of the rotation which is received from the planetary gear mechanism 203, and an output shaft 205 that outputs running torque of the high-speed gear mechanism 204. The output shaft 205 is coupled to a drive shaft of the generator (not shown) so as to be capable of transmitting drive power.

The planetary gear mechanism 203 is constructed such that when the rotation of the main shaft 200 is transmitted to the input shaft 203a, the planet carrier 203b rotates, and therefore the sun gear 203d rotates with, increased speed through the planet gear 203c, and the rotation is transmitted to the low-speed shaft 204a of the high-speed gear mechanism 204. In addition, the high-speed gear mechanism 204 is constructed to rotate the intermediate shaft 204d with increased speed through the low-speed gear 204b and the first intermediate gear 204c when the rotation is transmitted from the planetary gear mechanism 203 to the low-speed shaft 204a rotates and further rotate the output shaft 205 with increased speed through the second intermediate gear 204e and the high-speed gear 204f.

As respective bearings for rotatably supporting the low-speed shaft 204a, the intermediate shaft 204d, and the output shaft 205 of the speed up gears 202, roller bearings 206 to 211 are frequently, used (see JP 2007-232186 A, for example).

SUMMARY OF THE INVENTION

In the wind power generating device, smearing (a phenomenon in which surface layer seizure is generated) on the rolling contact surface of a roller or a raceway surface of a turning wheel is generated in the roller bearing that supports the output shaft which rotates at high speed, and therefore lifetime of the roller bearing may decrease. The object of the present invention is to provide a power generating device that can effectively prevent the smearing from generating in the roller bearing that supports the output shaft of the speed up gears.

The inventor of the present application eagerly studied about generating mechanism of the smearing. As a result, the inventor has found that when the rotation speed of the main shaft rapidly decreases by the decrease of the wind force, the rotation speed of the drive shaft of the generator exceeds the rotation speed of the output shaft by inertia of the rotor of the generator which has heavy weight, and therefore so-called torque loss (load loss) occurs, the radial load that is applied to the roller bearing which supports the output shaft is reduced through the torque loss, sliding friction drag between the roller and the cage that holds the roller exceeds the rolling friction drag between the roller of the roller bearing and the turning wheel, and thus the rotation of the roller is delayed. The inventor has also found that when the rotation speed of the main shaft rapidly increases by the increase of the Wind power from the state described above, inertia torque from the increased rotation speed is added to increase the radial load that is applied to the roller bearing which supports the output shaft, and therefore the roller slips on the contact surface with the turning wheel in a state in which high load is applied to the roller at the moment, the temperature of the contact surface rises, and thus the smearing is generated. The inventor accomplished the invention of the present application based on the findings.

Aspects of the present invention relate to a power generating device. The power generating device includes: speed up gears including a main shaft that rotates by external force, a rotation transmission mechanism that receives rotation of the main shaft to increase speed of the rotation of the main shaft, and a roller bearing that rotatably supports an output shaft that outputs running torque of the rotation transmission mechanism; a generator including a drive shaft which is rotated by receiving rotation of the output shaft and configured to generate electricity in connection with rotation of a rotor which rotates together with the drive shaft; an input rotor provided to the output shaft to be capable of rotating together with the output shaft; an output rotor provided to the drive shaft to be capable of rotating together with the (hive shaft and concentrically arranged on a radial inside or a radial outside of the input rotor; and a one-way clutch disposed between the input rotor and the output rotor, the one-way clutch being configured to connect the input rotor with the output rotor to rotate together with the input rotor and the output rotor when a rotation speed of the input rotor exceeds a rotation speed of the output rotor, and the one-way clutch being configured to release a connection between the input rotor and the output rotor when the rotation speed of the input rotor falls below the rotation speed of the output rotor.

According to the power generating device that is constructed as described above, the one-way clutch can connect the input rotor with the output rotor so as to be capable of rotating together when the rotation speed of the input rotor exceeds the rotation speed of the output rotor and releases the connection between the input rotor and the output rotor when the rotation speed of the input rotor falls below the rotation speed of the output rotor. That is to say, even when the rotation speed of the output shaft rapidly falls by a drop in the external force through the main shaft, the rotation of the rotor of the generator by inertia can be prevented from being transmitted to the output shaft through the drive shaft. Accordingly, the decrease in radial load that is applied to the roller bearing which supports the output shaft and rotation delay of the roller in association with the decrease in the radial load can be inhibited. Therefore, when the rotation speed of the main shaft rapidly increases by the change in the external force from the state described above, and high load is applied to the roller, the roller hardly slips on the contact surface with the turning wheel, and therefore the smearing on the roller bearing can be effectively prevented from generating.

The power generating device may include a rolling bearing disposed between the input rotor and the output rotor and configured to support the input rotor and the output rotor so that the input rotor and the output rotor relatively rotate with each other. The one-way clutch may include an outer peripheral surface of an inner ring, an inner peripheral surface of an outer ring, and a roller arranged in each of plural wedge-shaped spaces formed between the outer peripheral surface of the inner ring and the inner peripheral surface of the outer ring. The one-way clutch may be configured to connect the input rotor with the output rotor to rotate together with the input rotor and the output rotor by engaging the roller with the outer peripheral surface of the inner ring and the inner peripheral surface of the outer ring, and the one-way clutch may be configured to release the connection between the input rotor and the output rotor by disengaging engagement of the roller with the outer peripheral surface of the inner ring and the inner peripheral surface of the outer ring. In this case, due to production of spacing between the inner ring outer peripheral surface and the outer ring inner peripheral surface when the engagement of the roller of the one-way clutch with the inner ring outer peripheral surface and the outer ring inner peripheral surface is disengaged, the relative movement of the input rotor and the output rotor with each other in the radial direction can be prevented by the rolling bearing. Therefore, the input rotor and the output rotor can be prevented from rattling in the radial direction during the operation of the power generating device.

The one-way clutch may include an annular cage configured to hold the plural rollers at specified spacing along a circumferential direction, a pair of the rolling bearings may be disposed between the input rotor and the output rotor, and the paired rolling bearings may be arranged on respective axial sides of the one-way clutch so that each of the paired rolling bearings is adjacent to the one-way clutch and an axial end of each of the paired rolling bearing is capable of coming into contact with a corresponding one of axial end faces of the annular cage of the one-way clutch. In this case, the axial end faces of the cage of the one-way clutch come into contact with the axial ends of a pair of the rolling bearings, and therefore the movement of the cage to the axial sides can be restricted.

The paired rolling bearings may be a pair of cylindrical roller bearings that include plural cylindrical rollers and a portion with which end faces of the plural cylindrical rollers in an axial direction come into sliding contact, and the axial end faces of the annular cage may come into contact with the portion in the pair of the cylindrical roller bearings. In this case, the inner ring rib of the rolling bearing can be used as a member that restricts the axial movement of the cage, and therefore the structure of the rolling bearing can be simplified.

The inner peripheral surface of the outer ring of the one-way clutch may be a cylindrical surface, the cylindrical roller bearing may include a raceway surface of an outer ring of the cylindrical roller bearing where the cylindrical roller bearing rolls, the output rotor may be arranged on a radial outside of the input rotor, and the inner peripheral surface of the outer ring of the one-way clutch and the raceway surface may be formed in an inner peripheral surface of the output rotor. In this case, the output rotor can be used as the outer ring that has the outer ring inner peripheral surface of the one-way clutch and the outer ring that has the outer ring raceway surface of the respective cylindrical roller bearing, and therefore the structure of the entire wind device can be simplified.

The output rotor may be removably secured to the drive shaft and arranged to be movable in the axial direction with respect to the input rotor. In this case, the output rotor can be removed from the input rotor when the output rotor is removed from the drive shaft and moved in the axial direction with respect to the input rotor. Accordingly, the outer ring of the one-way clutch and the outer ring of the cylindrical roller bearing can be removed at the same time, and therefore maintenance tasks of the one-way clutch and the cylindrical roller bearing can easily be done. In this case, there is no need to move the generator, and therefore the maintenance tasks can be done more easily.

According to the power generating device of the present invention, the smearing can be effectively prevented from generating in the roller bearing that supports the output shaft of the speed up gears.

In the power generating device, when burn-out of the generator occurs, the drive shaft becomes hard to rotate, the transmission torque from the output shaft to the drive shaft becomes excessively high, and the speed up gears receives overload, and therefore there is a possibility that the speed up gears may be damaged.

The present invention provides a power generating device that can effectively prevent the smearing from generating in the roller bearing which supports the output shaft of the speed up gears and reduces the load that is applied to the speed up gears in a case where, the transmission torque from the output shaft to the drive shaft of the generator becomes excessively high.

In the power generating device described above, the one-way clutch may be provided with a torque limiter configured to release the connection between the input rotor and the output rotor when transmission torque from the input rotor to the output rotor exceeds an upper limit.

According to the power generating device that is constructed as described above, the one-way clutch can connect the input rotor with the output rotor so as to be capable of rotating together when the rotation speed of the input rotor exceeds the rotation speed of the output rotor and releases the connection between the input rotor and the output rotor when the rotation speed of the input rotor falls below the rotation speed of the output rotor. That is to say, even when the rotation speed of the output shaft rapidly falls by a drop in the external force through the main shaft, the rotation of the rotor of the generator by inertia can be prevented from being transmitted to the output shaft through the drive shaft. Accordingly, the decrease in radial load that is applied to the roller bearing which supports the output shaft and rotation delay of the roller in association with the decrease in the radial load can be inhibited. Therefore, when the rotation speed of the main shaft rapidly increases by the change in the external force from the state described above, and high load is applied to the roller, the roller hardly slips on the contact surface with the turning wheel, and therefore the smearing on the roller bearing can be effectively prevented from generating.

In addition, the one-way clutch is provided with the torque limiter, and therefore when the drive shaft becomes hard to rotate by the burn-out of the generator, and the transmission torque from the input rotor on the side of the output shaft to the output rotor on the side of the drive shaft exceeds the upper limit (the input rotor is connected to the output rotor to be put into a locked state), the torque limiter can release the connection between the input rotor and the output rotor. Accordingly, the load that is applied to the speed up gears can be reduced, and the speed up gears can be prevented from being damaged. In addition, because the one-way clutch is provided with the torque limiter, a simplification and size reduction of the structure can be put into practice in comparison with a case where the one-way clutch and the torque limiter are provided separately.

The one-way clutch may include an inner peripheral surface of an outer ring provided to one of the input rotor and the output rotor, an outer peripheral surface of an inner ring provided to another of the input rotor and the output rotor and configured to form plural wedge-shaped spaces in a circumferential direction with the inner peripheral surface of the outer ring, and a roller arranged in each of the plural wedge-shaped spaces; the one-way clutch may be configured to connect the input rotor with the output rotor to rotate together with the input rotor and the output rotor by engaging the roller with the outer peripheral surface of the inner ring and the inner peripheral surface of the outer ring, the one-way clutch may be configured to release the connection between the input rotor and the output rotor by disengaging engagement of the roller with the outer peripheral surface of the inner ring and the inner peripheral surface of the outer ring; and the torque limiter may be provided with an accommodating recess that is formed in the outer peripheral surface of the inner ring, and that accommodates the roller separated from the wedge-shaped space, when the transmission torque exceeds the upper limit, to disengage the engagement of the roller with the outer peripheral surface of the inner ring and the inner peripheral surface of the outer ring.

According to the above structure, when transmission torque from the input rotor to the output rotor exceeds an upper limit, the roller that is separated from the wedge-like space is accommodated in the accommodating recess, and the engagement of the roller with the inner ring outer peripheral surface and the outer ring inner peripheral surface is disengaged. Therefore, the connection from the input rotor to the output rotor can be released appropriately.

The outer peripheral surface of the inner ring may be provided in the input rotor, and the torque limiter may be provided with a separation prevention device that prevents the roller in the accommodating recess from being separated from the accommodating recess by centrifugal force due to rotation of the input rotor. When the input rotor rotates in a state where the roller is accommodated in the accommodating recess, and the roller moves out of the accommodating recess by the centrifugal force, there is a possibility of the engagement of the roller with the inner ring outer peripheral surface and the outer ring inner peripheral surface again. However, the torque limiter of the present invention includes the separation prevention device that prevents the roller from being separated from the accommodating recess, and therefore such the problems can be solved.

The separation prevention device may be constructed such that a restricting section that restricts the movement of the roller accommodated in the accommodating recess to the radial outside is protruded in an edge of the accommodating recess in the circumferential direction. According to such the structure, if the roller is separated from the accommodating recess to the radial outside by centrifugal force due to the rotation of the input rotor, the control section becomes an obstacle to prevent the separation. Therefore, the engagement of the roller with the inner ring outer peripheral surface and the outer ring inner peripheral surface again can be prevented suitably.

A pocket configured to be capable of accommodating the roller may be provided between the outer peripheral surface of the inner ring and the inner peripheral surface of the outer ring; a cage configured to hold the rollers at specified spacing along the circumferential direction and an elastic member configured to bias the roller in the pocket toward a narrowing direction of the wedge-shaped space may be provided between the outer peripheral surface of the inner ring and the inner peripheral surface of the outer ring; and the accommodating recess may be formed to have a depth in which the roller is positioned in a radial inside with respect to the elastic member. According to the above structure, when the roller separates from the pocket of the cage to enter into the accommodating recess, the elastic member extends to be positioned in the radial outside of the roller. Therefore, if the roller is separated from the accommodating recess to the radial outside by centrifugal force in association with the rotation of the input rotor, the elastic member becomes an obstacle, and the separation can be prevented.

The elastic member may be provided with a block member that blocks at least a part of the accommodating recess that accommodates the roller. According to the above structure, when the elastic member is disposed in the radial outside of the roller that enters into the accommodating recess as described above, the block member can block at least a part of the accommodating recess and securely prevent the separation of the roller.

According to the power generating device of the present invention, the smearing can be effectively prevented from generating in the roller bearing which supports the output shaft of the speed up gears, and the load that is applied to the speed up gears can be reduced in a case where the transmission torque from the output shaft to the drive shaft of the generator becomes excessively high. In addition, according to the one-way clutch of the present invention, when the transmission torque from the input shaft to the output shaft of the generator becomes excessively high, the connection between the input rotor and the output rotor can be preferably released, and furthermore the separation of the roller from the accommodating recess by centrifugal force due to the rotation of the input rotor and the engagement of the roller with the inner ring outer peripheral surface and the outer ring inner peripheral surface can be prevented.

In the wind power generating device, smearing (a phenomenon in which surface layer seizure is generated) on the rolling contact surface of a roller or a raceway surface of a turning wheel is generated in the roller bearing that supports the output shaft which rotates at high speed, and therefore lifetime of the roller bearing may decrease. The present invention provides a power generating device that can effectively prevent the smearing from generating in the roller bearing that supports the output shaft of the speed up gears.

The power generating device may include an inertia mass provided to be capable of rotating together with the output rotor.

According to the power generating device that is constructed as described above, the one-way clutch can connect the input rotor with the output rotor so as to be capable of rotating together when the rotation speed of the input rotor exceeds the rotation speed of the output rotor and releases the connection between the input rotor and the output rotor when the rotation speed of the input rotor falls below the rotation speed of the output rotor. That is to say, even when the rotation speed of the output shaft rapidly falls by a drop in the external force through the main shaft, the rotation of the rotor of the generator by inertia can be prevented from being transmitted to the output shaft through the drive shaft. Accordingly, the decrease in radial load that is applied to the roller bearing which supports the output shaft and rotation delay of the roller in association with the decrease in the radial load can be inhibited. Therefore, when the rotation speed of the main shaft rapidly increases by the change in the external force from the state described above, and high load is applied to the roller, the roller hardly slips on the contact surface with the turning wheel, and therefore the smearing on the roller bearing can be effectively prevented from generating.

In addition, the output rotor is provided with the inertia mass so as to be capable of rotating together, and therefore the inertia moment of the output rotor can be increased. Accordingly, the one-way clutch releases the connection between the input rotor and the output rotor, and when the output rotor rotates with decreased speed due to the inertia of the rotor, the angular acceleration by the deceleration becomes small. Therefore, the rotation speed of the output rotor can be prevented from rapidly decreasing. That is to say, even when the rotation speed of the main shaft rapidly falls by a drop in the external force, the rotor of the generator does not rapidly decreases the rotation speed in association with the output rotor but continues to rotate by the inertia, and therefore the average rotation speed of the rotor can be increased. Therefore, power generation efficiency of the generator can be improved.

The power generating device may include a rolling bearing disposed between the input rotor and the output rotor and configured to support the input rotor and the output rotor so that the input rotor and the output rotor relatively rotate with each other. The one-way clutch may include, an outer peripheral surface of an inner ring, an inner peripheral surface of an outer ring, and a roller arranged in each of plural wedge-shaped spaces formed between the outer peripheral surface of the inner ring and the inner peripheral surface of the outer ring. The one-way clutch may be configured to connect the input rotor with the output rotor to rotate together with the input rotor and the output rotor by engaging the roller with the outer peripheral surface of the inner ring and the inner peripheral surface of the outer ring. The one-way clutch may be configured to release the connection between the input rotor and the output rotor by disengaging engagement of the roller with the outer peripheral surface of the inner ring and the inner peripheral surface of the outer ring. In this case, due to production of spacing between the inner ring outer peripheral surface and the outer ring inner peripheral surface when the engagement of the roller of the one-way clutch with the inner ring outer peripheral surface and the outer ring inner peripheral surface is disengaged, the relative movement of the input rotor and the output rotor with each other in the radial direction can be prevented by the rolling bearing. Therefore, the input rotor and the output rotor can be prevented from rattling in the radial direction during the operation of the power generating device.

The one-way clutch may include an annular cage configured to hold the plural rollers at specified spacing along a circumferential direction, and a pair of the rolling bearings may be disposed between the input rotor and the output rotor. The paired rolling bearings may be arranged on respective axial sides of the one-way clutch so that each of the paired rolling bearings is adjacent to the one-way clutch and an axial end of each of the paired rolling bearings is capable of coming into contact with a corresponding one of axial end faces of the annular cage of the one-way clutch. In this case, the axial end faces of the cage of the one-way clutch come into contact with the axial ends of a pair of the rolling bearings, and therefore the movement of the cage to the axial sides can be restricted.

The pair of the rolling bearings may be a pair of cylindrical roller bearings that include plural cylindrical rollers and a portion with which end faces of the plural cylindrical rollers in an axial direction come into sliding contact, and the axial end faces of the annular cage may come into contact with the portion in the pair of the cylindrical roller bearings. In this case, the inner ring rib of the rolling bearing can be used as a member that restricts the axial movement of the cage, and therefore the structure of the rolling bearing can be simplified.

The inner peripheral surface of the outer ring of the one-way clutch may be a cylindrical surface, the cylindrical roller bearing may include a raceway surface of an outer ring of the cylindrical roller bearing where the cylindrical roller bearing rolls, the output rotor may be arranged on a radial outside of the input rotor, and the inner peripheral surface of the outer ring of the one-way clutch and the raceway surface may be formed in an inner peripheral surface of the output rotor. In this case, the output rotor can be used as the outer ring that has the outer ring inner peripheral surface of the one-way clutch and the outer ring that has the outer ring raceway surface of the respective cylindrical roller bearing, and therefore the structure of the entire wind device can be simplified.

The output rotor may be removably secured to the drive shaft and arranged to be movable in the axial direction with respect to the input rotor. In this case, the output rotor can be removed from the input rotor when the output rotor is removed from the drive shaft and moved in the axial direction with respect to the input rotor. Accordingly, the outer ring of the one-way clutch and the outer ring of the cylindrical roller bearing can be removed at the same time, and therefore maintenance tasks of the one-way clutch and the cylindrical roller bearing can easily be done. In this case, there is no need to move the generator, and therefore the maintenance tasks can be done more easily.

The power generating device may include: an electromagnetic clutch configured to connect the output rotor with the inertia mass so that the output rotor and the inertia mass rotate together during energization and to release the connection between the output rotor and the inertia mass in non-energization; a detection device configured to detect the rotation speed of the output rotor; and a control device configured to control to put the electromagnetic clutch into non-energization state at startup of rotation of the output rotor and to control to energize the electromagnetic clutch when the detection device detects that the output rotor reaches a specified rotation speed after the startup of the rotation of the output rotor. In this case, the electromagnetic clutch is not energized and the connection between the output rotor and the inertia mass is released until the output rotor reaches the specified rotation speed at the startup of the rotation, and therefore the running torque that is required to rotate the output rotor up to the specified rotation speed can be reduced. Accordingly, time that is required to rotate the rotor up to the specified rotation speed through the output rotor and the drive shaft can be reduced, and therefore the power generation efficiency of the generator can be improved more. When the detection means detects that the output rotor reaches the specified rotation speed after the startup of the rotation of the output rotor, the electromagnetic clutch is energized, and the output rotor and the inertia mass are connected so as to be capable of rotating together, and therefore the inertia moment of the output rotor can be increased. Accordingly, when the one-way clutch releases the connection between the input rotor and the output rotor, the rotor of the generator does not rapidly decreases the rotation speed in association with the output rotor but continues to rotate by the inertia, and therefore the average rotation speed of the rotor can be increased. Therefore, power generation efficiency of the generator can be improved more.

The power generating device may include a viscous fluid coupling disposed between the output rotor and the inertia mass. The viscous fluid coupling may include; i) viscous fluid that transmits a running torque of the output rotor to the inertia mass by viscous drag during low-speed rotation of the output rotor, and ii) a centrifugal clutch mechanism that transmits the running torque of the output rotor to the inertia mass by using centrifugal force in association with high-speed rotation of the output rotor during the high-speed rotation of the output rotor. In this case, when the output rotor rotates at low speed during the startup of the rotation, the running torque of the output rotor is transmitted to the inertia mass by viscous drag of the viscous fluid, and therefore the inertia mass increases the speed with lower angular acceleration than the angular acceleration of the output rotor. In other words, inertia torque by the inertia mass which is applied to the output rotor at the startup of the rotation of the output rotor can be reduced, and therefore the running torque that is required to increase the rotation speed of the output rotor up to the specified rotation speed can be reduced. Accordingly, time that is required to increase the rotation speed of the rotor up to the specified rotation speed through the output rotor and the drive shaft can be reduced, and therefore the power generation efficiency of the generator can be improved. In addition, when the output rotor reaches the specified rotation speed to rotate at high speed, the running torque of the output rotor, is transmitted to the inertia mass through the centrifugal clutch mechanism. Accordingly, the output rotor and the inertia mass are connected so as to be capable of rotating together, and therefore the inertia moment of the output rotor can be increased. Therefore, when the one-way clutch releases the connection between the input rotor and the output rotor, the rotor of the generator does not rapidly decreases the rotation speed in association with the output rotor but continues to rotate by the inertia, and therefore the average rotation speed of the rotor can be increased, and the power generation efficiency of the generator can be improved more.

According to the power generating device of the present invention, the smearing can be effectively prevented from generating in the roller bearing that supports the output shaft of the speed up gears.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
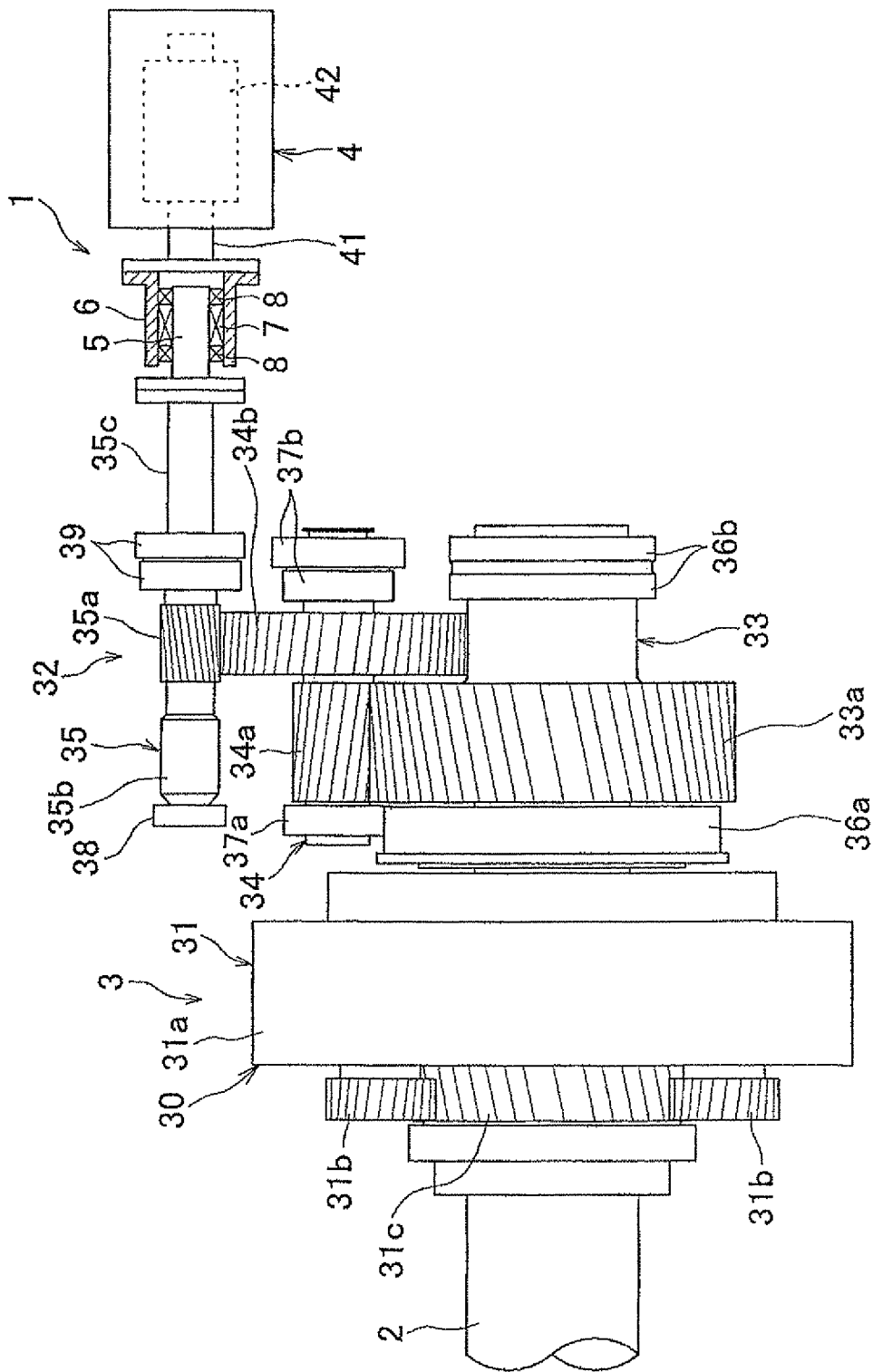
FIG. 1 is a schematic side view that shows a power generating device according to a first and a second embodiments of the present invention.

Hereinafter, embodiments of the present invention will be described in detail with reference to attached drawings. FIG. 1 is a schematic side view that shows a power generating device according to a first and a second embodiments of the present invention. The power generating device of the present embodiment is a wind power generating device 1. The wind power generating device 1 includes a main shaft 2 that rotates by receiving wind force (external force), speed up gears 3 that are coupled to the main shaft 2, and a generator 4 that is coupled to the speed up gears 3. The rotation of the main shaft 2 is increased in speed by the speed up gears 3, and the generator 4 is driven by rotative power with increased speed.

At a tip end of the main shaft 2, blades (not shown), for example, are coupled so as to be capable of rotating together, and the blades are constructed to receive the wind force to rotate together with the main shaft 2. The generator 4 has a drive shaft 41 that receives the rotative power with increased speed by the speed up gears 3 to rotate, and a rotor 42 that is installed in the generator 4, and a stator (not shown). The rotor 42 is coupled to the drive shaft 41 so as to be capable of rotating together, and electricity is generated in connection with the rotation of the drive shaft 41 and the driving of the rotor 42.

The speed up gears 3 include a gear mechanism (rotation transmission mechanism) 30 that receives the rotation of the main shaft 2 to increase the speed of the rotation. The gear mechanism 30 includes a planetary gear mechanism 31 and a high-speed gear mechanism 32 that receives the rotation of which the speed is increased by the planetary gear mechanism 31 and further increases the speed of the rotation. The planetary gear mechanism 31 has an internal gear (ring gear) 31a, plural planet gears 31b that are held by a planet carrier (not shown) which is coupled to the main shaft 2 so as to be capable of rotating together, and a sun gear 31c that meshes with the planet gears 31b. Accordingly, when the planet carrier rotates together with the main shaft 2, the sun gear 31c rotates through the planet gears 31b, and the rotation is transmitted to a low-speed shaft 33 of the high-speed gear mechanism 32.

The high-speed gear mechanism 32 includes the low-speed shaft 33 that has a low-speed gear 33a, an intermediate shaft 34 that has a first intermediate gear 34a and a second intermediate gear 34b, and an output shaft 35 that has a high-speed gear 35a. The low-speed shaft 33 is formed with a large rotating shaft of which the diameter is about 1 m and concentrically arranged with the main shaft 2. Both ends of the low-speed shaft 33 in the axial direction are supported by roller bearings 36a and 36b for rotation. The intermediate shaft 34 is arranged above the low-speed shaft 33. Both ends of the intermediate shaft 34 in the axial direction are supported by roller bearings 37a and 37b for rotation. The first intermediate gear 34a on the intermediate shaft 34 meshes with the low-speed gear 33a, and the second intermediate gear 34b meshes with the high-speed gear 35a. The output shaft 35 is arranged above the intermediate shaft 34 and adapted to output the running torque. Sides of one end 35b and another end (output end) 35c of the output shaft 35 in the axial direction are respectively supported by roller bearings 38 and 39 for rotation.

According to the above structure, the rotation of the main shaft 2 is increased in speed in three stages with a gear ratio of the planetary gear mechanism 31, a gear ratio between the low-speed gear 33a and the first intermediate gear 34a, and a gear ratio between the second intermediate gear 34b and the high-speed gear 35a. The running torque is output from the output end 35c of the output shaft 35. Therefore, the rotation of the main shaft 2 by the wind force is increased in speed in three stages by the speed up gears 3 and adapted to drive the generator 4.

Figure 2:
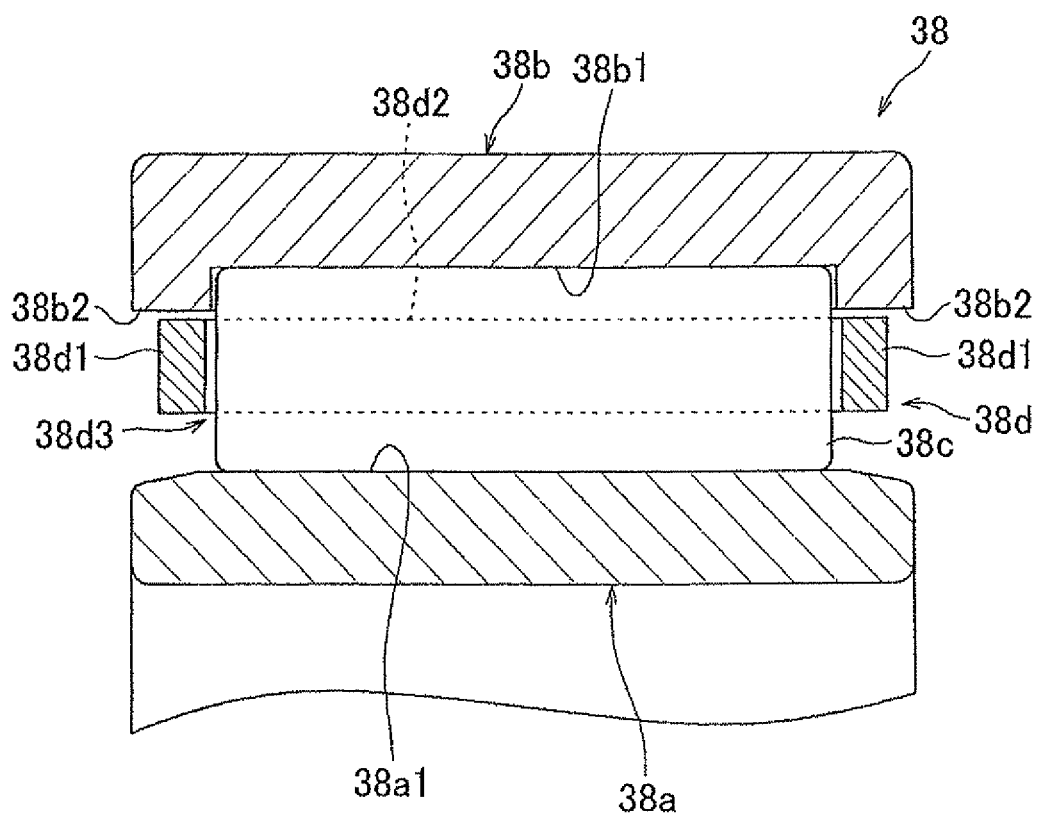
FIG. 2 is a cross-sectional view that shows a roller bearing of speed up gears in the power generating device which is shown in FIG. 1.

FIG. 2 is a cross-sectional view that shows the roller bearing 38 which supports one end 35b of the output shaft 35. In FIG. 2, the roller bearing 38 is formed by a cylindrical roller bearing and includes an inner ring 38a that is fitted and fixed onto the output shaft 35, an outer ring 38b that is fixed to a housing (not shown), plural cylindrical rollers 38c that are placed between the inner ring 38a and the outer ring 38b so as to be capable of rolling, and an annular cage 38d that holds respective cylindrical rollers 38c at specified spacing along the circumferential direction. The inner ring 38a, the outer ring 38b, and the cylindrical roller 38c are made of bearing steel, for example. The cage 38d is made of a copper alloy, for example.

The inner ring 38a has an inner ring raceway surface 38a1 that is formed at an axial center of the outer periphery. The outer ring 38b is concentrically arranged with the inner ring 38a and has an outer ring raceway surface 38b1 that is formed at an axial center of the inner periphery and a pair of outer ring ribs 38b2 that are formed in axial sides of the outer ring raceway surface 38b1. The outer ring raceway surface 38b1 is arranged to face the inner ring raceway surface 38a1. The outer ring ribs 38b2 are formed to protrude from both ends of the inner periphery of the outer ring 38b in the axial direction to an inner side in a radial direction. An end face of the cylindrical roller 38c comes into sliding contact with the outer ring ribs 38b2.

The cylindrical roller 38c is placed between the inner ring raceway surface 38a1 of the inner ring 38a and the outer ring raceway surface 38b1 of the outer ring 38b so as to be capable of rolling. The cage 38d has a pair of annular sections 38d1 that are separately placed in the axial direction and plural column sections 38d2 that are placed at equal spacing along the circumferential direction of the annular sections 38d1 to connect both of the annular sections 38d1. Pockets 38d3 are respectively formed between the pair of annular sections 38d1 and the adjacent column sections 38d2, and the respective cylindrical rollers 38c are placed in the pockets 38d3.

As shown in FIG. 1, the wind power generating device 1 further includes an input rotor 5 that is provided so as to be capable of rotating together with the output shaft 35 of the speed up gears 3, an output rotor 6 that is provided so as to be capable of rotating together with the drive shaft 41 of the generator 4, a one-way clutch 7 that is disposed between the input rotor 5 and the output rotor 6, and a pair of rolling bearings 8 that are disposed on axial sides of the one-way clutch 7. The one-way clutch 7 and the rolling bearings 8 are constructed to transmit the rotation of the output shaft 35 to the drive shaft 41 through the input rotor 5 and the output rotor 6. Here, the wind power generating device 1 of the present embodiment is constructed such that the rolling bearings 8 are disposed in the axial sides of the one-way clutch 7; however, a rolling bearing 8 may be disposed in only one axial side of the one-way clutch 7.

Figure 3:
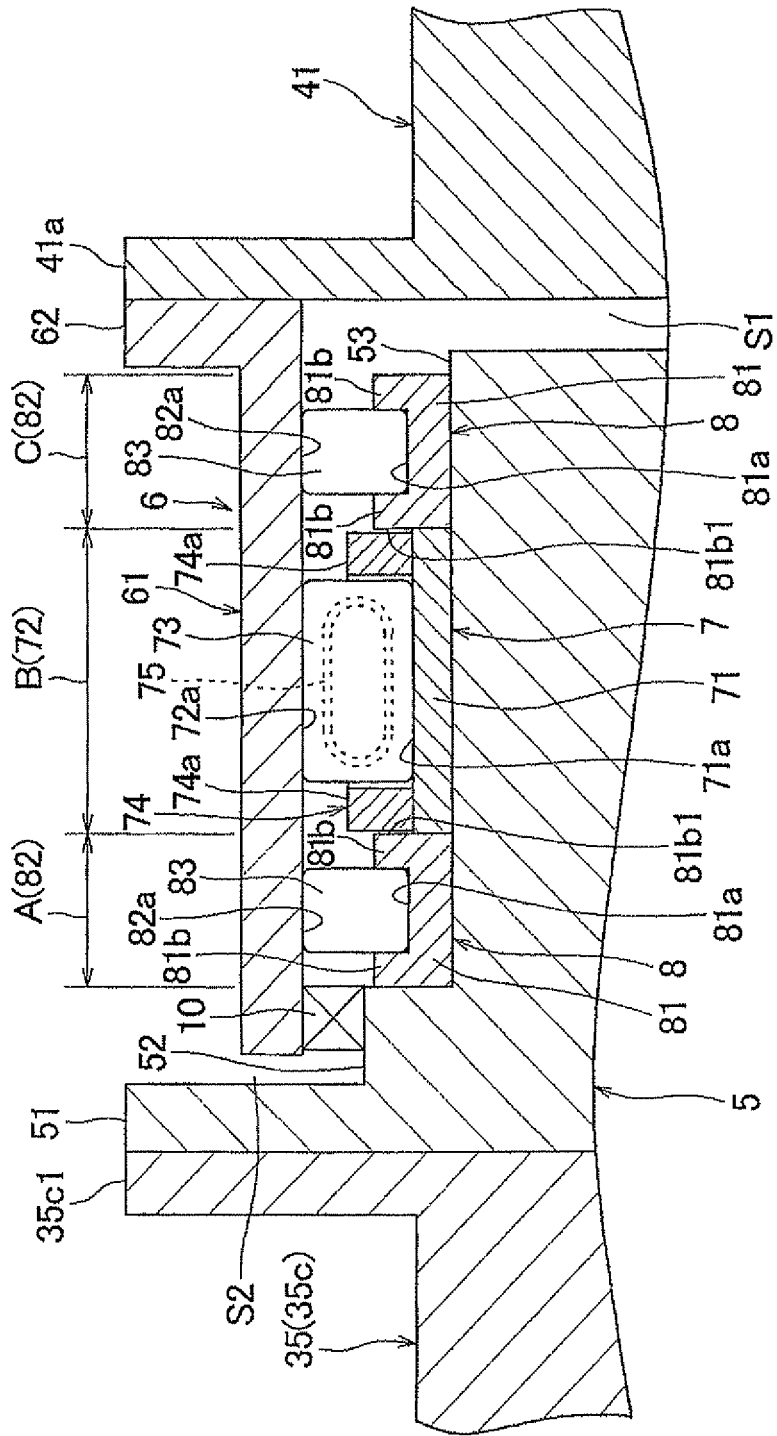
FIG. 3 is a cross-sectional view that shows a connection part between an output shaft of the speed up gears and a drive shaft of a generator in the power generating device according to the first embodiment and shown in FIG. 1.

First, the first embodiment will be described. FIG. 3 is a cross-sectional view that shows a connection part between the output shaft 35 of the speed up gears 3 and the drive shaft 41 of the generator 4. In FIG. 3, the input rotor 5 is concentrically arranged with the output shaft 35 and has a flange section 51, a large diameter section 52, and a small diameter section 53 in this order from one axial end (left end of FIG. 3) to another axial end (right end of FIG. 3). The flange section 51 is formed to extend to a radial outside beyond the outer peripheral surface of the large diameter section 52 and removably secured in the output end 35e of the output shaft 35. Specifically, the flange section 51 is fastened on a flange section 35c1 that is formed in the output end 35c in an abutting state against the flange section 35c1 with a bolt and a nut (not shown). A spacing S1 is formed between the end face of the small diameter section 53 and the end face of a flange section 41a of the drive shaft 41.

The output rotor 6 is concentrically arranged on a radial outside of the input rotor 5 and has a cylindrical section 61 and a flange section 62 that is formed in another axial end (right end of FIG. 3) of the cylindrical section 61. The flange section 62 is formed to extend to a radial outside beyond the outer peripheral surface of the cylindrical section 61 and removably secured in one end of the drive shaft 41. Specifically, the flange section 62 is fastened on a flange section 41a that is formed in one end of the drive shaft 41 in an abutting state against the flange section 41a with a bolt and a nut (not shown).

An inner peripheral surface of the cylindrical section 61 is formed in a cylindrical surface. An annular seal member 10 for sealing an annular space between the cylindrical section 61 and the small diameter section 53 of the input rotor 5 is disposed in the spacing between the inner peripheral surface of the cylindrical section 61 in one axial end (left end of FIG. 3) and the outer peripheral surface of the large diameter section 52 of the input rotor 5. A spacing S2 is formed between an end face of the cylindrical section 61 on one end side and an end face of the flange section 51 of the input rotor 5 that faces the end face of the cylindrical section 61. Accordingly, the output rotor 6 can move to both axial sides with respect to the input rotor 5 in a state in which the output rotor 6 is separated from the drive shaft 41.

Figure 4:
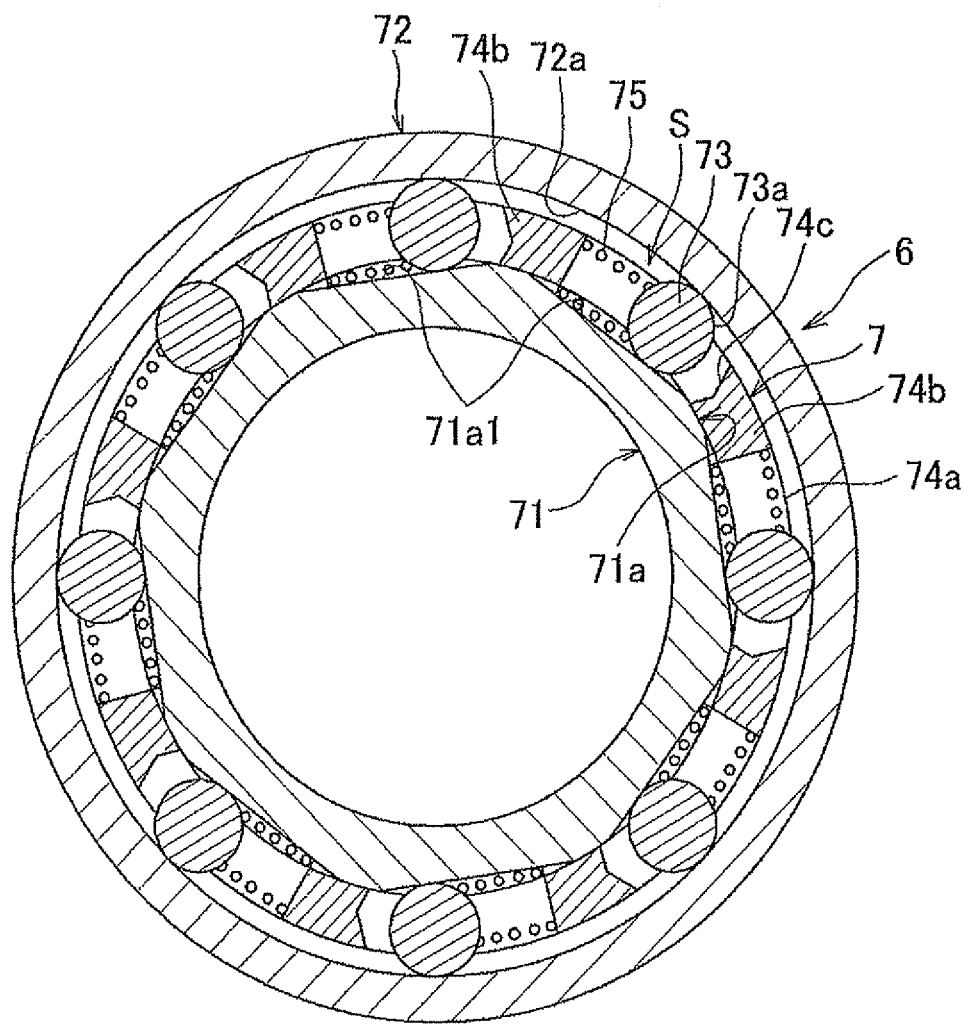
FIG. 4 is a cross-sectional view that shows a one-way clutch in the power generating device according to the first and a third embodiments.

FIG. 4 is a cross-sectional view that shows the one-way clutch 7. In FIG. 3 and FIG. 4, the one-way clutch 7 includes an inner ring 71, an outer ring 72, and plural rollers 73 that are disposed between an outer peripheral surface 71a of the inner ring 71 and an inner peripheral surface 72a of the outer ring 72. The inner ring 71 is fitted and secured onto the axial center of the small diameter section 53 of the input rotor 5 and constructed to rotate together with the small diameter section 53. A region B in the axial center of the cylindrical section 61 of the output rotor 6 is set as the outer ring 72 of the one-way clutch 7. Therefore, the inner peripheral surface 72a is formed in an inner peripheral surface of the cylindrical section 61 in the region B. The rollers 73 are formed in a circular cylindrical shape, and eight rollers are disposed in the circumferential direction in the present embodiment.

The one-way clutch 7 further includes an annular cage 74 that holds respective rollers 73 at specified spacing along the circumferential direction and plural elastic members 75 that elastically bias the respective rollers 73 toward one direction. The cage 74 has a pair of annular sections 74a that face each other in the axial direction and plural column sections 74b that extend between both annular sections 74a in the axial direction and are arranged at equal spacing in the circumferential direction to connect both annular sections 74a. Plural pockets 74c are formed between both annular sections 74a and the adjacent column sections 74b, and the respective rollers 73 are separately accommodated in the respective pockets 74c. The elastic members 75 are formed with a helical compression spring and separately accommodated in the respective pockets 74c of the cage 74 to be installed in the column sections 74b.

In FIG. 4, flat cam surfaces 71a1 that have the same number as the rollers 73 (eight) are formed in the outer peripheral surface 71a of the inner ring 71. The inner peripheral surface 72a of the outer ring 72 is formed to be a cylindrical surface. Plural (eight) wedge-shaped spaces S are formed in the circumferential direction between the cam surfaces 71a1 of the inner ring 71 and the cylindrical surface of the outer ring 72. The rollers 73 are separately arranged in the respective wedge-shaped spaces S, and the elastic members 75 bias the rollers 73 toward the direction in which the wedge-shaped spaces S become narrow. The outer peripheral surface of a roller 73 is formed to be a contact surface 73a that comes into contact with a cam surface 71a1 of the inner ring 71 and a cylindrical surface of the outer ring 72, and the contact surface 73a is formed straight in a width direction (axial direction). The one-way clutch 7 is placed in an environment where grease as lubricant that is made from ester base oil and a urea-based thickener and hardly affected by temperature changes is provided between the inner ring 71 and the outer ring 72.

In the one-way clutch 7 that is constructed as described above, in a case where the input rotor 5 rotates with increased speed and therefore the rotation speed of the input rotor 5 exceeds that of the output rotor 6, the inner ring 71 makes relative rotation to the outer ring 72 in one direction (counterclockwise direction of FIG. 4). In this case, the roller 73 slightly moves to the direction in which the wedge-shaped space S becomes narrow by the biasing force of the elastic member 75, the contact surface 73a of the roller 73 is brought into contact with the outer peripheral surface 71a of the inner ring 71 and the inner peripheral surface 72a of the outer ring 72 (i.e., the roller 73 is pressed toward the inner ring 71 and the outer ring 72), and the one-way clutch 7 becomes a state in which the roller 73 engages between the inner ring 71 and the outer ring 72. Accordingly, the inner ring 71 and the outer ring 72 can rotate together in one direction and connect the input rotor 5 with the output rotor 6 so as to be capable of rotating together.

In a case where the rotation speed of the input rotor 5 becomes constant after increasing and the same speed as that of the output rotor 6, the roller 73 is kept in an engagement state between the inner ring 71 and the outer ring 72. Therefore, the one-way clutch 7 maintains corotation of the inner ring 71 and the outer ring 72 in one direction, and the input rotor 5 and the output rotor 6 continue to rotate together.

On the other hand, in a case where the input rotor 5 rotates with decreased speed and therefore the rotation speed of the input rotor 5 falls below that of the output rotor 6, the inner ring 71 makes relative rotation to the outer ring 72 in another direction (clockwise direction of FIG. 4). In this case, the roller 73 slightly moves to the direction in which the wedge-shaped space S becomes wide against the biasing force of the elastic member 75, and therefore the engagement of the roller 73 with the inner ring 71 and the outer ring 72 is disengaged. Accordingly, the engagement of the roller 73 is disengaged, and therefore the connection between the input rotor 5 and the output rotor 6 is released.

In FIG. 3, a pair of rolling bearings 8 are respectively disposed between the small diameter section 53 of the input rotor 5 and the cylindrical section 61 of the output rotor 6 and support the input rotor 5 and the output rotor 6 for relative rotation with each other. The rolling bearings 8 are arranged on the axial sides of the one-way clutch 7 adjacent to each other so that the axial ends of the rolling bearings 8 can come into contact with the axial end faces of the cage 74 of the one-way clutch 7 in the axial end.

A rolling bearing 8 is provided with an inner ring 81, an outer ring 82, and a cylindrical roller bearing that includes plural cylindrical rollers 83 which are placed between the inner ring 81 and the outer ring 82 so as to be capable of rolling. The inner ring 81 has an inner ring raceway surface 81a that is formed in an outer periphery and an inner ring rib 81b that is formed on axial sides of the inner raceway surface 81a to protrude toward a radial outside. End faces of the cylindrical roller 83 respectively come into sliding contact with an inner surface of the inner ring rib 81b. In addition, an outer surface 81b1 of the inner ring rib 81b adjacent to the one-way clutch 7 is formed to be a contact surface that comes into contact with an outer surface of the annular section 74a which is an axial end face of the cage 74 of the one-way clutch 7.

Regions A and C in axial end faces of the cylindrical section 61 of the output rotor 6 are set as the outer ring 82 of the rolling bearing 8. An outer ring raceway surface 82a of the outer ring 82 is formed in respective inner peripheral surfaces of the regions A and C. The cylindrical roller 83 is placed between the outer ring raceway surface 82a and the inner ring raceway surface 81a so as to be capable of rolling.

According to the wind power generating device 1 that is constructed as described above, the one-way clutch 7 that is disposed between the input rotor 5 which rotates together with the output shaft 35 of the speed up gears 3 and the output rotor 6 which rotates together with the drive shaft 41 of the generator 4 can release the connection between the input rotor 5 and the output rotor 6 when the rotation speed of the input rotor 5 falls below that of the output rotor 6. That is to say, when the rotation speed of the output shaft 35 rapidly falls by a drop in the wind force through the main shaft 2, the rotation of the rotor 42 of the generator 4 by inertia can be prevented from being transmitted to the output shaft 35 through the drive shaft 41. Accordingly, the decrease in radial load that is applied to the roller bearing 38 which supports the output shaft 35 and rotation delay of the cylindrical roller 38c in association with the decrease in the radial load can be inhibited. Therefore, when the rotation speed of the main shaft 2 rapidly increases by the change in the wind force and high load is applied to the cylindrical roller 38 from the above state, the cylindrical roller 38c hardly slides on the contact surface with the inner ring 38a, and therefore the production of smearing on the roller bearing 38 can be inhibited effectively.

In addition, by preventing the rotation of the rotor 42 of the generator 4 by inertia from being transmitted to the output shaft 35, loads that are applied to the roller bearings 36a, 36b, 37a, 37b, 38, 39, and the like of the speed up gears 3 can be reduced. Accordingly, the size reduction of all of the gears 31b and 31c of the planetary gear mechanism 31, the shafts 33 through 35 of the high-speed gear mechanism 32, and the roller bearings 36a, 36b, 37a, 37b, 38, and 39 can be achieved, and therefore the speed up gears 3 can be reduced in weight and manufactured at low cost. Furthermore, by releasing the connection between the input rotor 5 and the output rotor 6, the rotor 42 of the generator 4 continues to rotate by inertia without rapid slow down, and therefore average rotation speed of the rotor 42 can be increased. Accordingly, power generation efficiency of the generator 4 can be improved.

Between the input rotor 5 and the output rotor 6, the rolling bearing 8 that supports the rotors so as to be capable of relatively rotating to each other is disposed. Thus, by releasing the engagement of the roller 73, the inner ring 71, and the outer ring 72 in the one-way clutch 7, when the spacing between the roller 73 and the inner and the outer rings 71 and 72 is produced in the wedge-shaped spacing S, the rolling bearing 8 can prevent the input rotor 5 and the output rotor 6 from relatively moving to each other in the radial direction. Therefore, the input rotor 5 and the output rotor 6 can be prevented from rattling in the radial direction during the operation of the wind power generating device 1.

Because a pair of the rolling bearings 8 are arranged on the axial sides of the one-way clutch 7 adjacent to each other, and the axial end faces of the cage 74 of the one-way clutch 7 are formed to be capable of contact with the axial ends of the rolling bearings 8, the movement of the cage 74 to the axial sides can be restricted. Specifically, because the axial end face of the cage 74 of the one-way clutch 7 (outer surface of the annular section 74a) comes into contact with the inner ring rib 81b of the rolling bearing 8, the inner ring rib 81b of the rolling bearing 8 can also be used as a member that restricts the axial movement of the cage 74. Accordingly, the structure of the rolling bearing 8 can simplified.

In addition, because the outer ring inner peripheral surface 72a of the one-way clutch 7 and the outer ring raceway surface 82a of the rolling bearing 8 are formed in the inner peripheral surface of the output rotor 6, the output rotor 6 can be used as the outer ring 72 of the one-way clutch 7 and the outer ring 82 of the rolling bearing 8. Accordingly, the structure of the entire wind power generating device 1 can be simplified. Because the output rotor 6 is removably secured to the drive shaft 41 of the generator 4 and arranged in a movable manner in the axial direction with respect to the input rotor 5, the output rotor 6 can be removed from the input rotor 5 when the output rotor 6 is removed from the drive shaft 41 and moved in the axial direction with respect to the input rotor 5. Accordingly, the outer ring 72 of the one-way clutch 7 and the outer ring 82 of the rolling bearing 8 can be removed at the same time, and therefore maintenance tasks of the one-way clutch 7 and the rolling bearing 8 can easily be done. In this case, there is no need to move the generator 4, and therefore the maintenance tasks can be done more easily.

The present invention is not limited to the first embodiment described above and can be changed appropriately to be practiced. For example, in the first embodiment, the input rotor and the output rotor are respectively provided to the output shaft and the drive shaft as separate members; however, the input rotor and the output rotor may integrally be formed with the output shaft and the drive shaft, respectively. The output rotor is arranged on the radial outside of the input rotor; however, the output rotor may be arranged on the radial inside of the input rotor. In this case, the one-way clutch may be formed with the cam surface in the outer ring inner peripheral surface, and the inner ring outer peripheral surface may be formed as the cylindrical surface. Furthermore, in this case, the inner ring outer peripheral surface may be formed in the outer peripheral surface of the output rotor, and the output rotor may be used as the inner ring.

In addition, the output rotor is formed as the outer ring of the one-way clutch and the outer ring of the rolling bearing; however, these outer rings may be provided to the output rotor as separate members. The rolling bearing that is disposed between the input rotor and the output rotor is constructed as the cylindrical roller bearing in order to move the output rotor in the axial direction; however, the rolling bearing may be constructed as a ball bearing in a case where the output rotor is not moved in the axial direction.

The cage of the one-way clutch comes into contact with the inner ring of the rolling bearing; however, the outer ring of the rolling bearing may be provided to the output rotor as a separate member, and the outer ring may come into contact with the cage of the one-way clutch. The power generating device of the present embodiment is exemplified in a case of using wind force as external force; however, the power generating device of the present embodiment may be applicable to the power generating device that generates electricity by using other external force such as waterpower or thermal power.

Figure 5:
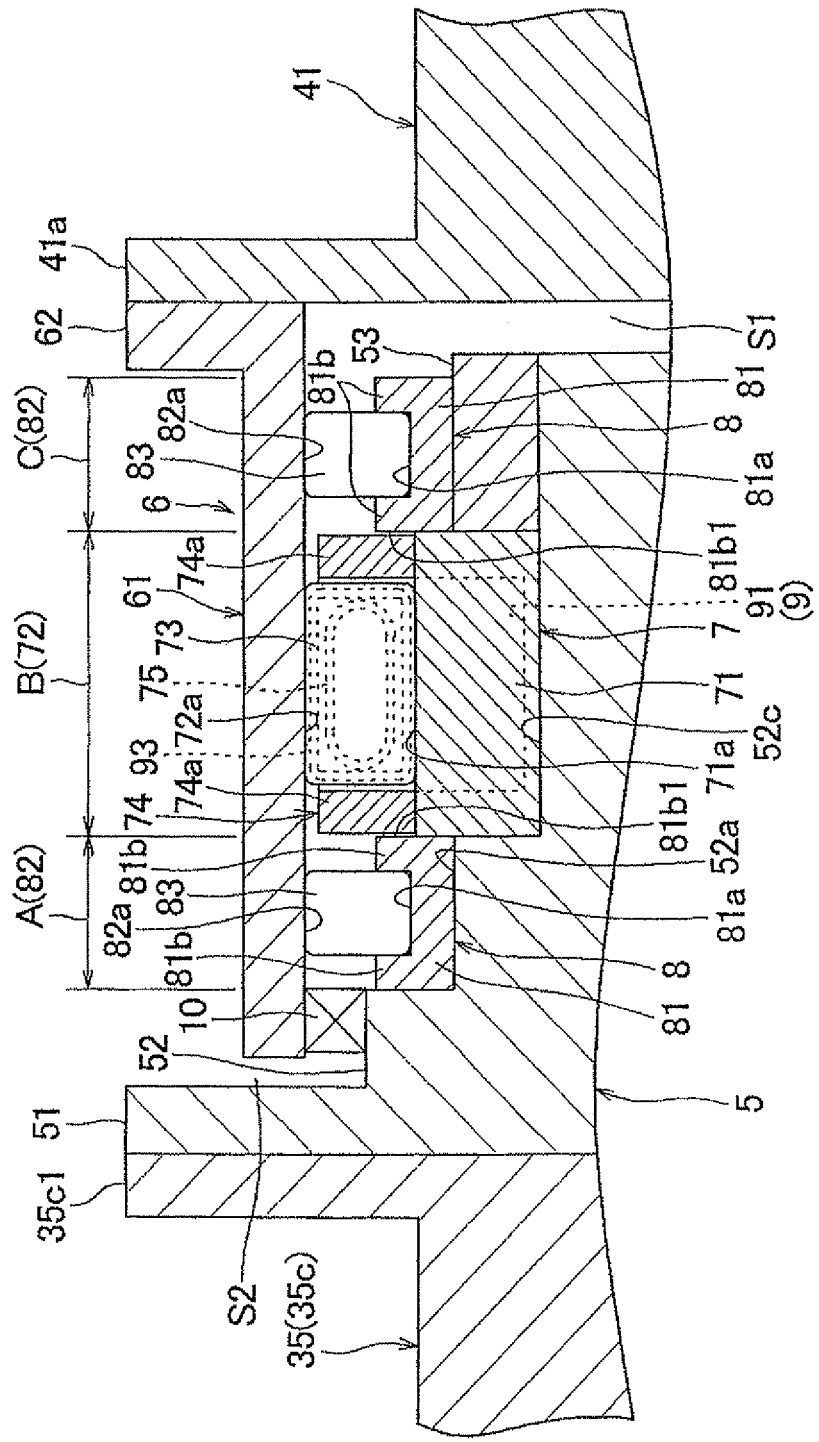
FIG. 5 is a cross-sectional view that shows a connection part between an output shaft of the speed up gears and a drive shaft of a generator in the power generating device according to the second embodiment and shown in FIG. 1.

Next, the structure of the power generating device of the second embodiment in regard to the one-way clutch will be described. Descriptions of the structure that overlaps with the first embodiment are not, repeated. FIG. 5 is a cross-sectional view that shows a connection part between the output shaft 35 of the speed up gears 3 and the drive shaft 41 of the generator 4. In FIG. 5, the input rotor 5 is concentrically arranged with the output shaft 35 and has a flange section 51, a large diameter section 52a, a medium diameter section 52b, and a small diameter section 52c in this order from one axial end (left end of FIG. 5) to another axial end (right end of FIG. 5).

The flange section 51 is formed to extend to a radial outside beyond the outer peripheral surface of the large diameter section 52a and removably secured in the output end 35c of the output shaft 35. Specifically, the flange section 51 is fastened on a flange section 35c1 that is formed in the output end 35c of the output shaft 35 in an abutting state against the flange section 35c1 with a bolt and a nut (not shown). A spacing S1 is formed between the end face of the small diameter section 52c and the end face of the flange section 41a of the drive shaft 41.

The output rotor 6 is concentrically arranged on a radial outside of the input rotor 5 and has a cylindrical section 61 and a flange section 62 that is formed in another axial end (right end of FIG. 5) of the cylindrical section 61. The flange section 62 is formed to extend to a radial outside beyond the outer peripheral surface of the cylindrical section 61 and removably secured in one end (left end of FIG. 5) of the drive shaft 41. Specifically, the flange section 62 is fastened on a flange section 41a that is formed in one end of the drive shaft 41 in an abutting state against the flange section 41a with a bolt and a nut (not shown).

An inner peripheral surface of the cylindrical section 61 is formed in a cylindrical surface. Au annular seal member 10 for sealing an annular space between the cylindrical section 61 and the medium diameter section 52b and the small diameter section 52c of the input rotor 5 is disposed in the spacing between the inner peripheral surface of the cylindrical section 61 in one axial end (left end of FIG. 5) and the outer peripheral surface of the large diameter section 52a of the input rotor 5. A spacing 52 is formed between an end face of the cylindrical section 61 on one end side and an end face of the flange section 51 of the input rotor 5 that faces the end face of the cylindrical section 61. Accordingly, the output rotor 6 can move to both axial sides with respect to the input rotor 5 in a state in which the output rotor 6 is separated from the drive shaft 41.

Figure 6:
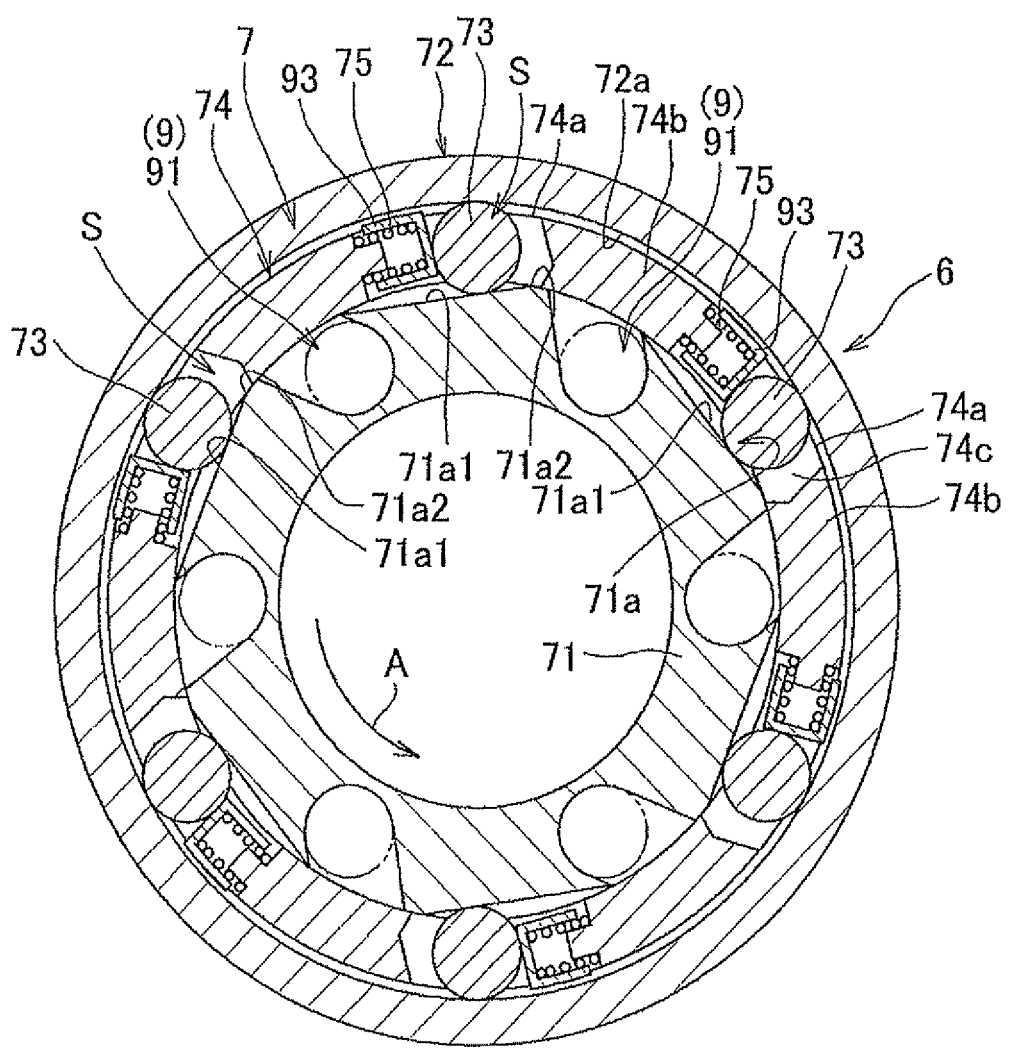
FIG. 6 is a cross-sectional view that shows a one-way clutch in the power generating device according to the second embodiment and shown in FIG. 1.
Figure 7:
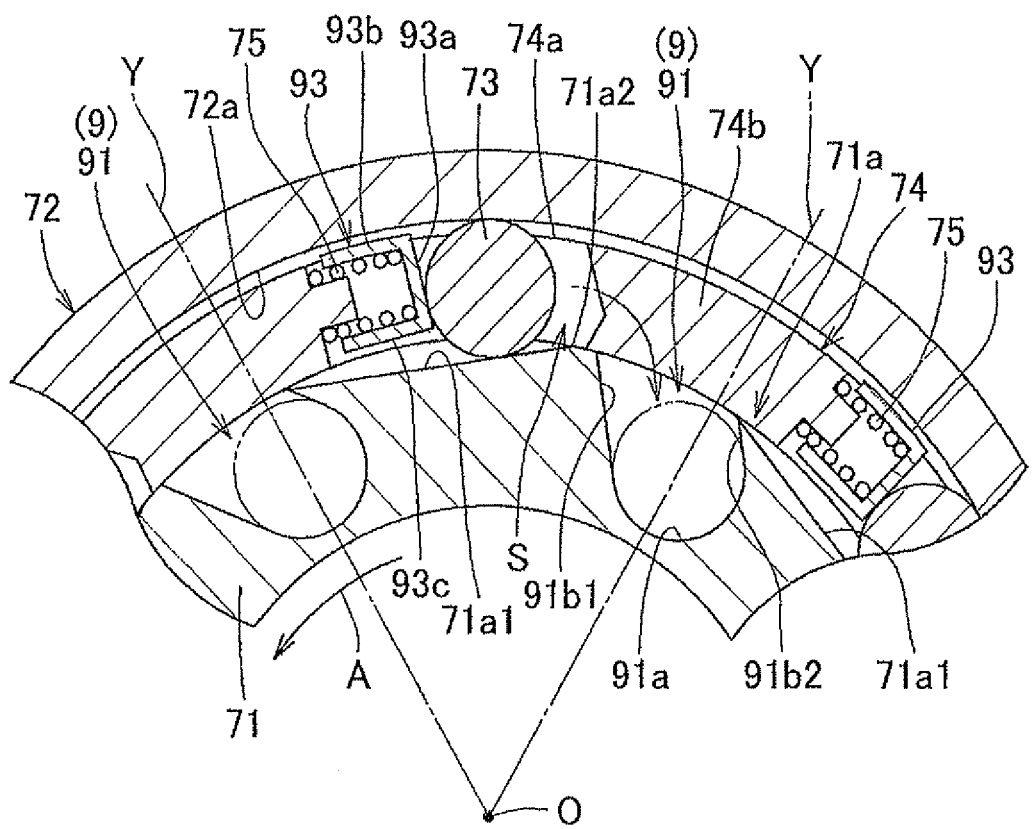
FIG. 7 is a cross-sectional view that shows a part of the one-way clutch in an enlarged scale according to the second embodiment.

FIG. 6 is a cross-sectional view that shows the one-way clutch 7, and FIG. 7 is a cross-sectional view that shows a part of the one-way clutch 7 in an enlarged scale. In FIG. 5 through FIG. 7, the one-way clutch 7 includes an inner ring 71, an outer ring 72, and plural rollers 73 that are disposed between an outer peripheral surface 71a of the inner ring 71 and an inner peripheral surface 72a of the outer ring 72. The inner ring 71 is fitted and secured onto a left side of the small diameter section 52c of the input rotor 5 and constructed to rotate together with the small diameter section 52e in a direction of an arrow A of FIG. 6. A region B in the axial center of the cylindrical section 61 of the output rotor 6 is set as the outer ring 72 of the one-way clutch 7. Therefore, the inner peripheral surface 72a is formed in an inner peripheral surface of the cylindrical section 61 in the region B. The rollers 73 are formed in a circular cylindrical shape, and six rollers are disposed in the circumferential direction in the present embodiment.

In FIG. 6, flat cam surfaces 71a1 that have the same number as the rollers 73 (*six*) are formed in the outer peripheral surface 71a of the inner ring 71. The inner peripheral surface 72a of the outer ring 72 is formed to be a cylindrical surface. Plural (six) wedge-shaped spaces S are formed in the circumferential direction between the cam surfaces 71a1 of the inner ring 71 and the cylindrical surface 72a of the outer ring 72. The rollers 73 are separately arranged in the respective wedge-shaped spaces 8, and the elastic members 75 bias the rollers 73 toward the direction in which the wedge-shaped spaces S become narrow (narrowing direction). The outer peripheral surface of a roller 73 is formed to be a contact surface that comes into contact with a cam surface 71a1 of the inner ring 71 and a cylindrical surface 72a of the outer ring 72. The one-way clutch 7 is placed in an environment where grease as lubricant that is made from ester base oil and a urea-based thickener and hardly affected by temperature changes is provided between the inner ring 71 and the outer ring 72.

In the one-way clutch 7 that has a structure as described above, in a case where the input rotor 5 rotates with increased speed and therefore the rotation speed of the input rotor 5 exceeds that of the output rotor 6, the inner ring 71 makes relative rotation to the outer ring 72 in one direction (direction of the arrow A (counterclockwise direction) of FIG. 6). In this case, the roller 73 slightly moves to the direction in which the wedge-shaped space S becomes narrow by the biasing force of the elastic member 75, the outer peripheral surface of the roller 73 is brought into contact with the outer peripheral surface 71a (cam surface 71a1) of the inner ring 71 and the inner peripheral surface 72a of the outer ring 72 (i.e., the roller 73 is pressed toward the inner ring 71 and the outer ring 72), and the roller 73 becomes a state of engaging between the inner ring 71 and the outer ring 72. Accordingly, the inner ring 71 and the outer ring 72 rotate together in the direction of the arrow A, and the input rotor 5 and the output rotor 6 are connected so as to be capable of rotating together.

In a case where the rotation speed of the input rotor 5 becomes constant after increasing and the same speed as that of the output rotor 6, the roller 73 is kept in an engagement state between the inner ring 71 and the outer ring 72. Therefore, the inner ring 71 and the outer ring 72 maintain corotation in the direction of the arrow A, and the input rotor 5 and the output rotor 6 continue to rotate together.

On the other hand, in a case where the input rotor 5 rotates with decreased speed and therefore the rotation speed of the input rotor 5 falls below that of the output rotor 6, the inner ring 71 makes relative rotation to the outer ring 72 in another direction (opposite direction of the arrow A (clockwise direction) of FIG. 6). In this case, the roller 73 slightly moves to the direction in which the wedge-shaped space S becomes wide against the biasing force of the elastic member 75, and therefore the engagement state of the outer peripheral surface of the roller 73 with the inner ring 71 and the outer ring 72 is disengaged. Accordingly, the connection between the input rotor 5 and the output rotor 6 is released.

The wind power generating device 1 that is the power generating device of the second embodiment produces a similar effect to the wind power generating device 1 of the first embodiment.

The one-way clutch 7 of the present embodiment is provided with a torque limiter 9. The torque limiter 9 is adapted to release the connection between the input rotor 5 and the output rotor 6 in a case where running torque that is transmitted from the input rotor 5 to the output rotor 6 exceeds a specified value (upper limit). As described above, the one-way clutch 7 is constructed such that the input rotor 5 rotates in the direction of the arrow A with increased speed, and therefore the roller 73 engages between the earn surface 71a1 and the inner peripheral surface 72a of the outer ring 72 and makes the output rotor 6 rotate together in the direction of the arrow A. However, when burn-out of the generator 4 occurs and the drive shaft 41 becomes hard to rotate, the output rotor 6 that is coupled to the drive shaft 41 also becomes hard to rotate, and the running torque that is transmitted from the input rotor 5 to the output rotor 6 becomes excessively high. Thus, the speed up gears 3 between the output shaft 35 that is coupled to the input rotor 5 and the main shaft 2 receives overload, and there is a possibility that gears and bearings in the speed up gears 3 may be damaged.

The torque limiter 9 of the present embodiment is provided for solving the disadvantages as described above and has an accommodating recess 91 that is formed in the outer peripheral surface 71a of the inner ring 71 and can accommodate the roller 73 as shown in FIG. 6 and FIG. 7. The accommodating recess 91 is formed in a corresponding position between the cam surfaces 71a1 next to each other in the circumferential direction. Therefore; a total of six accommodating recesses 91 are formed in the present embodiment. The roller 73 that comes into contact with the cam surface 71a1 which is adjacently arranged in the direction of the arrow A is adapted to fall and be accommodated into the accommodating recess 91 when the roller 73 passes over an end section 71a2 of the cam surface 71a1.

As shown in FIG. 7, a bottom section 91a of the accommodating recess 91 is formed in an arc surface that has approximately same radius as that of the roller 73. Side wall sections 91b1 and 91b2 that are formed in circumferential directions of the bottom section 91a are formed in parallel with each other and in inclined surfaces that are inclined with respect to an imaginary line Y in the radial direction which passes through a shaft center O of the one-way clutch 7 and a center of curvature of the bottom section 91a so that the radial outside of the side wall section is located in the direction of the arrow A. Therefore, the side wall section 91b1 in the vicinity of the roller 73 which is not accommodated in the accommodating recess 91 and is located between the cam surface 71a1 and the inner peripheral surface 72a of the outer ring 72 is formed to be long in length, and the side wall section 91b2 on a far side from the roller 73 is formed to be short in length. In addition, an angle between the cam surface 71a1 and a surface of the side wall section 91b1 is set to 90° or greater (for example, about 90° through 120°).

The accommodating recess 91 is formed to have a depth in which the entire roller 73 can be accommodated. Therefore, the roller 73 that is accommodated in the accommodating recess 91 is positioned in a radial inside with respect to the elastic member 75. The elastic member 75 is provided with a cover member 93. The cover member 93 is formed, as shown in FIG. 7, in a bottomed square tube shape so as to surround one circumferential end face (end face on a side of the roller 73), a radial outer surface, a radial inner surface, and axial side surfaces of the elastic member 75. A section 93a that covers one circumferential end face comes into contact with the roller 73, A section 93b that covers the radial outer surface of the elastic member 75 is formed in an arc shape along the inner peripheral surface 72a of the outer ring 72. A coating of fluorocarbon polymers or molybdenum disulfide is applied to the section 93b so that the section 93b can smoothly slide when coming into contact with the inner peripheral surface 72a of the outer ring 72, and therefore friction drag is reduced.

Figure 8:
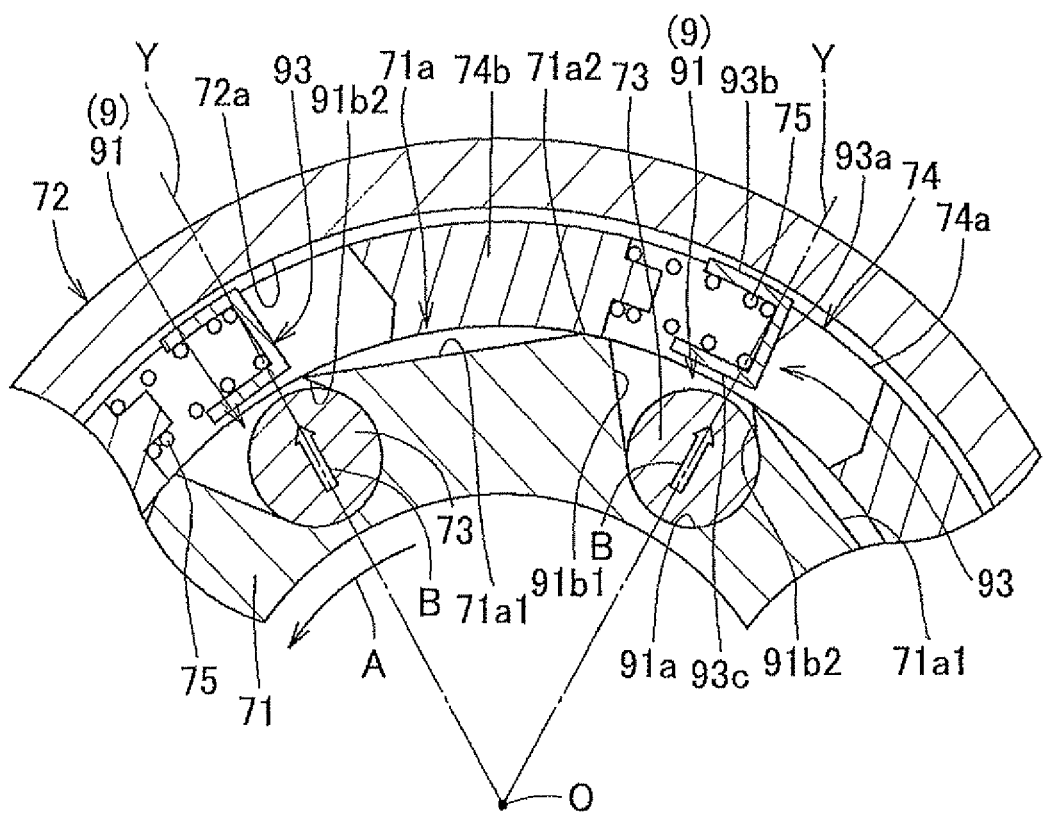
FIG. 8 is a cross-sectional view that shows in an enlarged scale a part of the one-way clutch according to the second embodiment in a state in which a roller is accommodated in an accommodating recess.

When the running torque that is transmitted from the input rotor 5 to the output rotor 6 exceeds the upper limit, the roller 73 passes over the end section 71a2 from the cam surface 71a1, drops into the accommodating recess 91 as shown in FIG. 8, and is separated from the wedge-shaped space S between the cam surface 71a1 and the inner peripheral surface 72a of the outer ring 72. Therefore, the connection between the input rotor 5 and the output rotor 6 is fully released, and the transmission of the running torque between both rotors is cut off. Thus, the input rotor 5 rotates nearly freely from load, the load that is applied to the speed up gears 3 can be reduced, and the speed up gears 3 can be prevented from being damaged.

The input rotor 5 continues to rotate with the increased speed by the speed up gears 3 as long as the main shaft 2 rotates after the roller 73 is accommodated into the accommodating recess 91. However, when the roller 73 is separated from the accommodating recess 91 toward the radial outside by centrifugal force due to the rotation of the input rotor 5 and again engages between the cam surface 71a1 and the inner peripheral surface 72a of the outer ring 72, the input rotor 5 is connected to the output rotor 6 to be locked, and the speed up gears 3 receives large, load. In order to prevent such the problem, the torque limiter 9 of the present embodiment is provided with separation prevention means (separation prevention device) that prevent the separation of the roller 73 from the accommodating recess 91.

Specifically, the separation prevention means is constructed such that one side wall section (that is, a control section that is an edge in the circumferential direction) 91b2 of the accommodating recess 91 protrudes toward the radial outside of the roller 73. That is, if the roller 73 moves to the radial outside (a direction of a hollow arrow B along the imaginary line Y) by the centrifugal force, the side wall section 91b2 of the accommodating recess 91 becomes an obstacle to the movement of the roller 73, and the separation of the roller 73 from the accommodating recess 91 can be prevented. Because inertial force opposite to the direction of the arrow A is imparted to the roller 73 by the rotation of the input rotor 5 in the direction of the arrow A, the roller 73 is more hardly separated from the accommodating recess 91.

In addition, the separation prevention means is also constructed with the elastic member 75 and the cover member 93. That is, when the roller 73 on the earn surface 71a1 drops into the accommodating recess 91, the elastic member 75 in the pocket 74c extends, the roller 73 is positioned in the radial inside of the elastic member 75 and the cover member 93, and at least a part of the accommodating recess 91 is blocked by the cover member 93. Therefore, if the roller 73 moves to the radial outside by the centrifugal force due to the rotation of the input rotor 5, the elastic member 75 and the cover member 93 become the obstacles to the movement of the roller 73, and separation of the roller 73 from the accommodating recess 91 can be prevented suitably. Particularly, the separation of the roller 73 from the accommodating recess 91 can securely be prevented by providing the cover member 93 to the elastic member 75.

In FIG. 5, a pair of the rolling bearings 8 are respectively disposed between the medium diameter section 52b of the input rotor 5 and the cylindrical section 61 of the output rotor 6 and between an intermediate ring body 53 that is fitted to the small diameter section 52e of the input rotor 5 so as to be capable of rotating together and the cylindrical section 61. The pair of the rolling bearings 8 support the input rotor 5 and the output rotor 6 each other for relative rotation. The rolling bearings 8 are adjacently arranged on the axial sides of the one-way clutch 7 so that the axial ends of the rolling bearings 8 can come into contact with the axial end faces of the cage 74 of the one-way clutch 7.

The present invention is not limited to the second embodiment described above and can be changed appropriately to be practiced. For example, in the second embodiment, the output rotor is formed as the outer ring of the one-way clutch and the outer ring of the rolling bearing; however, these outer rings may be provided to the output rotor as separate members. On the other hand, the input rotor can be formed as the inner ring of the one-way clutch and the inner ring of the rolling bearing. The rolling bearing that is disposed between the input rotor and the output rotor is constructed as the cylindrical roller bearing in order to move the output rotor in the axial direction; however, the rolling bearing may be constructed as a ball bearing in a case where the output rotor is not moved in the axial direction.

The accommodating recess of the torque limiter may not be necessarily formed in a depth that can accommodate the entire roller but may be formed deeper than at least the radius of the roller. When the accommodating recess is formed deeper than the radius of the roller, the control section can be formed without protruding from the inner ring-outer peripheral surface. The cage of the one-way clutch comes into contact with the inner ring of the rolling bearing; however, the outer ring of the rolling bearing may be provided to the output rotor as a separate member, and the outer ring may come into contact with the cage of the one-way clutch. Furthermore, the present embodiment exemplifies the wind power generating device that uses wind force as external force; however, the present invention may be applicable to the power generating device that generates electricity by using other external force such as waterpower or thermal power. The one-way clutch of the present invention is also applicable to applications other than the power generating device.

On example of the one-way clutch according to the present invention is disposed between the input rotor and the output rotor that is concentrically arranged on the radial outside of the input rotor, connects the input rotor with the output rotor so as to be capable of rotating together in a state where the rotation speed of the input rotor exceeds that of the output rotor, and releases the connection between the input rotor and the output rotor in a state where the rotation speed of the input rotor falls below that of the output rotor. The one-way clutch includes the inner peripheral surface of the outer ring, the outer peripheral surface of the inner ring, the roller and the torque limiter. The inner peripheral surface of the outer ring is provided on the side of the output rotor. The outer peripheral surface of the inner ring is provided on the side of the input rotor and forms plural wedge-shaped spaces in the circumferential direction with the inner peripheral surface of the outer ring. The roller is disposed in each of the plural wedge-shaped spaces, connects the input rotor with the output rotor so as to be capable of rotating together by engaging with the outer peripheral surface of the inner ring and the inner peripheral surface of the outer ring, and releases the connection by disengaging the engagement. The torque limiter includes the accommodating recess which is formed in the outer peripheral surface of the inner ring, and which accommodates the roller separated from a wedge-shaped space when the transmission torque from the input rotor to the output rotor exceeds the upper limit, and thereby disengages the engagement of the roller with the outer peripheral surface of the inner ring and the inner peripheral surface of the outer ring. The torque limiter is provided with the separation prevention means that prevents the roller in the accommodating recess from being separated from the accommodating recess by centrifugal force in association with the rotation of the input rotor.

The one-way clutch includes the torque limiter, and therefore when the transmission torque from the input rotor to the output rotor exceeds the upper limit (the input rotor is connected to the output rotor to be put into a locked state), the torque limiter releases the connection between the input rotor and the output rotor. When the input rotor rotates in a state where the roller is accommodated in the accommodating recess, and the roller moves out of the accommodating recess by the centrifugal force, there is a possibility of the engagement of the roller with the inner ring outer peripheral surface (i.e., the outer peripheral surface of the inner ring) and the outer ring inner peripheral surface (i.e., inner peripheral surface of the outer ring) again. However, the torque limiter that is one example of the present invention includes the separation prevention means that prevents the roller from being separated from the accommodating recess, and therefore such the problems can be solved.

The separation prevention means may be constructed such that the control section that controls the movement of the roller which is accommodated in the accommodating recess to the radial outside is protruded in the edge of the accommodating recess in the circumferential direction. According to such the structure, if the roller is separated from the accommodating recess by centrifugal force due to the rotation of the input rotor, the control section becomes an obstacle to prevent the separation. Therefore, the engagement of the roller with the inner ring outer peripheral surface and the outer ring inner peripheral surface again can be prevented suitably.

The cage that has a pocket which can accommodate the roller and maintains circumferential spacing of plural rollers and the elastic member that has a compression spring which biases the roller in the pocket toward the narrowing direction of the wedge-shaped space are provided between the inner ring outer peripheral surface and the outer ring inner peripheral surface. The separation prevention means may be constructed by forming the accommodating recess in a depth in which the roller can be positioned in the radial inside with respect to the elastic member. According to the above structure, when the roller separates from the pocket of the cage to enter into the accommodating recess, the elastic member extends to be positioned in the radial outside of the roller. Therefore, if the roller is separated from the accommodating recess to the radial outside by centrifugal force in association with the rotation of the input rotor, the elastic member becomes an obstacle, and the separation can be prevented.

The elastic member may be provided with a block member that blocks at least a part of the accommodating recess which accommodates the roller. According to the above structure, when the elastic member is disposed in the radial outside of the roller that enters into the accommodating recess as described above, the block member that is attached to the elastic member can block at least a part of the accommodating recess and securely prevent the separation of the roller.

Figure 9:
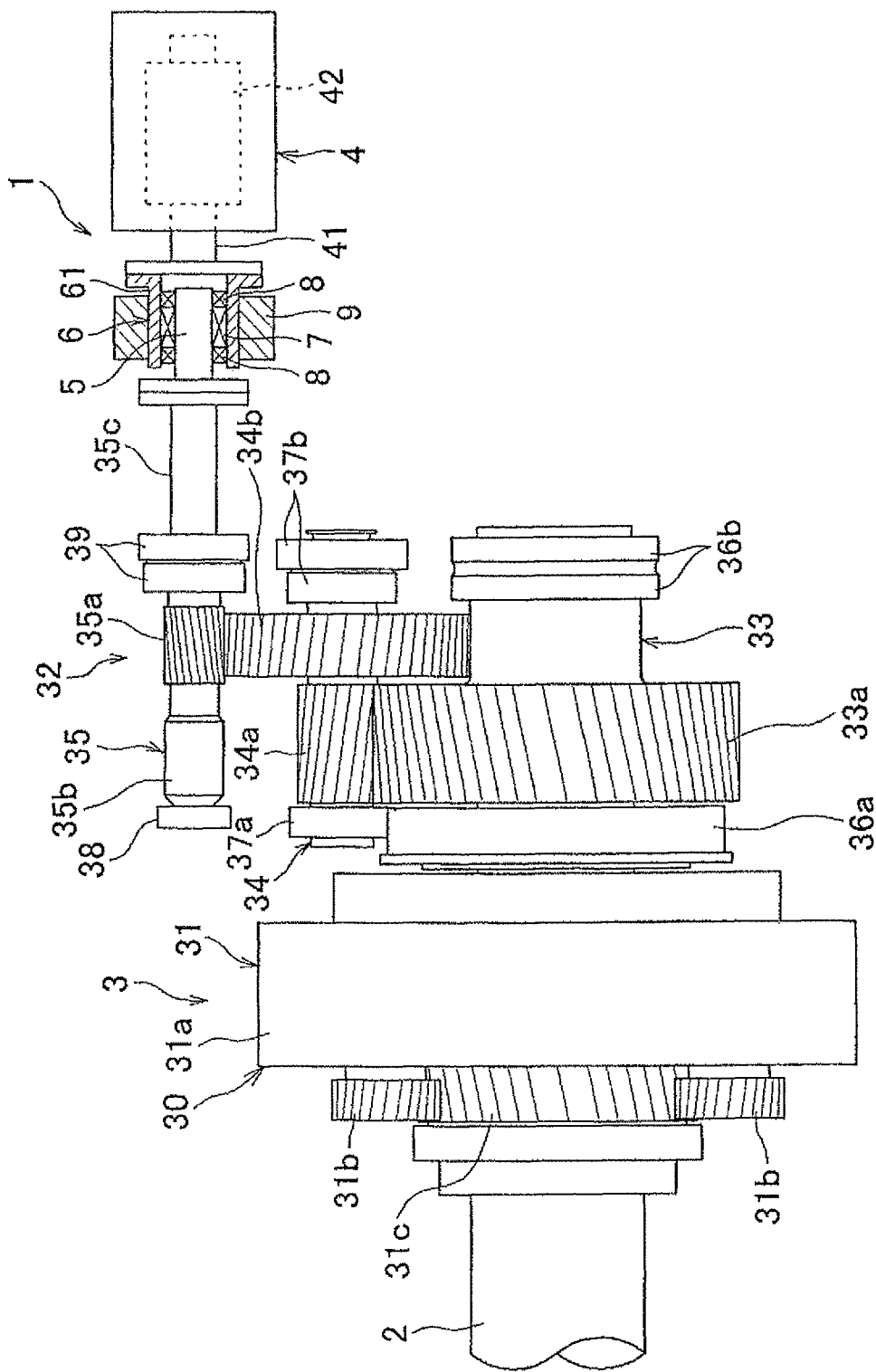
FIG. 9 is a schematic side view that shows a power generating device according to the third embodiment of the present invention.

Hereinafter, a third embodiment through a fifth embodiment of the present invention will be described in detail with reference to attached drawings. FIG. 9 is a schematic side view that shows a wind power generating device according to the third embodiment of the present invention.

In FIG. 9, the wind power generating device 1 further includes an input rotor 5 that is provided so as to be capable of rotating together with the output shaft 35 of the speed up gears 3, an output rotor 6 that is provided so as to be capable of rotating together with the drive shaft 41 of the generator 4, a one-way clutch 7 that is disposed between the input rotor 5 and the output rotor 6, a pair of rolling bearings 8 that are disposed on axial sides of the one-way clutch 7, and an inertia mass 9 that is provided so as to be capable of rotating together with the output rotor 6. The one-way clutch 7 and the rolling bearings 8 are constructed to transmit the rotation of the output shaft 35 to the drive shaft 41 through the input rotor 5 and the output rotor 6. Here, the wind power generating device 1 of the present embodiment is constructed such that the rolling bearings 8 are disposed in the axial sides of the one-way clutch 7; however, a rolling bearing 8 may be disposed in only one axial side of the one-way clutch 7.

Figure 10:
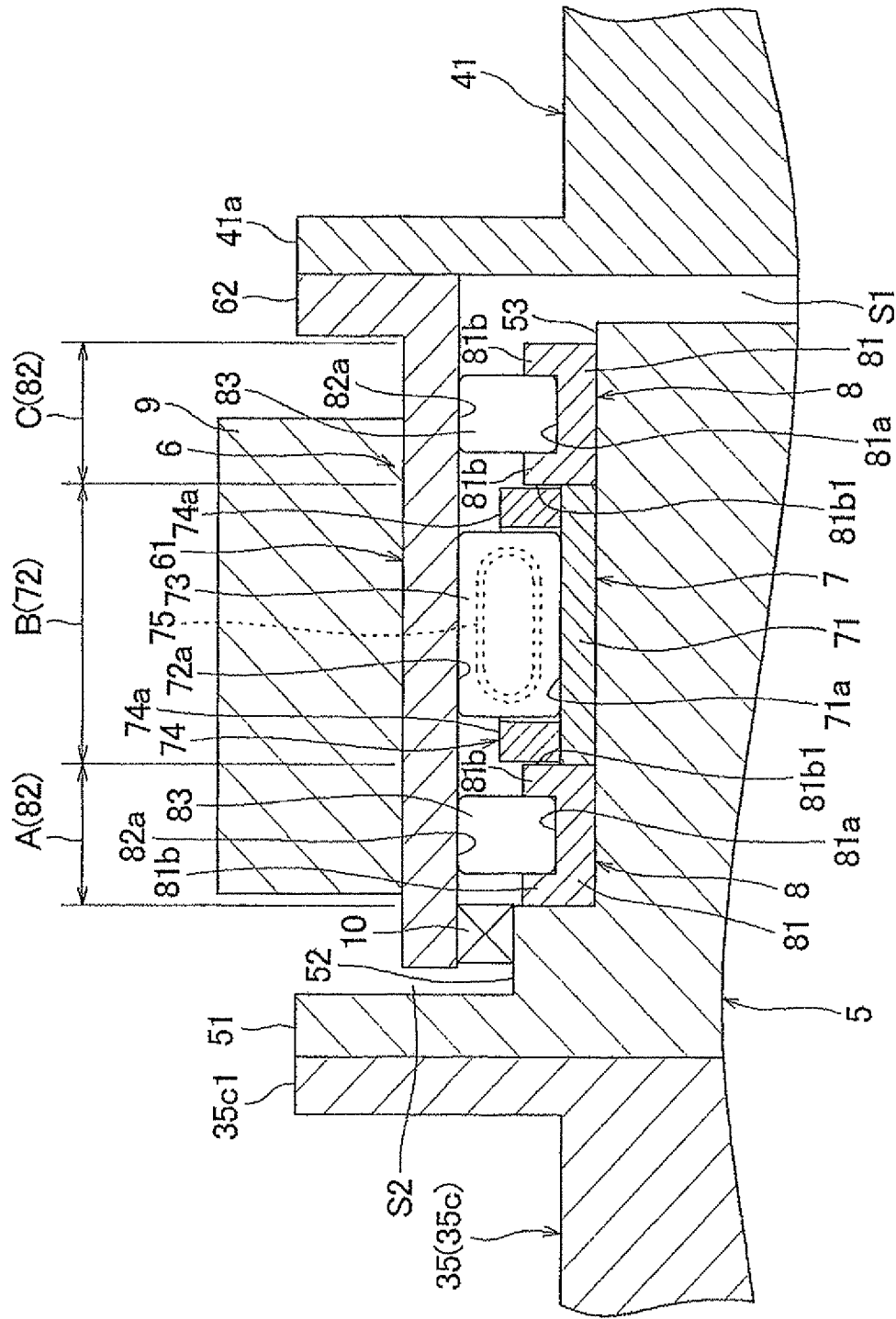
FIG. 10 is a cross-sectional view that shows a connection part between an output shaft of the speed up gears and a drive shaft of a generator in the power generating device according to the third embodiment and shown in FIG. 9.

FIG. 10 is the same as FIG. 3, except for the inertia mass 9. FIG. 4 also shows the one-way clutch 7 according to the third embodiment.

Figure 11:
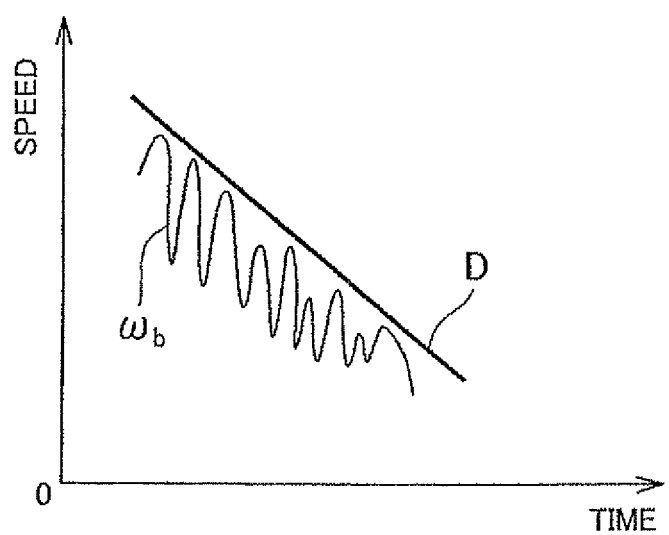
FIG. 11 is a graph that shows a rotational fluctuation of an output rotor in the power generating device according to the third embodiment.

In FIG. 9 and FIG. 10, the inertia mass 9 is formed in a cylindrical shape and fitted and secured onto the cylindrical section 61 of the output rotor 6. The inertia mass 9 is designed so that an angular acceleration ω dot a by the deceleration of the output rotor 6 which is calculated by the following equation (1) becomes smaller than an angular acceleration ω dot b by the deceleration of the output rotor 6 under an actual usage environment.

$$\omega\text{dot } a = T/I \tag{1}$$

where T is a torque for electric power generation, and I is inertia moment of the rotor of the generator and the inertia mass. In other words, the inertia mass 9 is designed so that the inertia moment I of the output rotor 6 and the rotor 42 of the generator 4 becomes large in order to reduce the angular acceleration ω dot a in the above equation (1) to be smaller than the angular acceleration ω dot b under the actual usage environment. When actual measured values of the rotation speed cob of the output rotor 6 are plotted on a graph, the values show a waveform that varies up and down with small amplitude as shown in FIG. 11. Therefore, when the slope of the line D that is drawn so as to pass slightly above peaks of the amplitude is set as the angular acceleration ω dot b under the actual usage environment the inertia mass 9 can preferably be designed.

Figure 12:
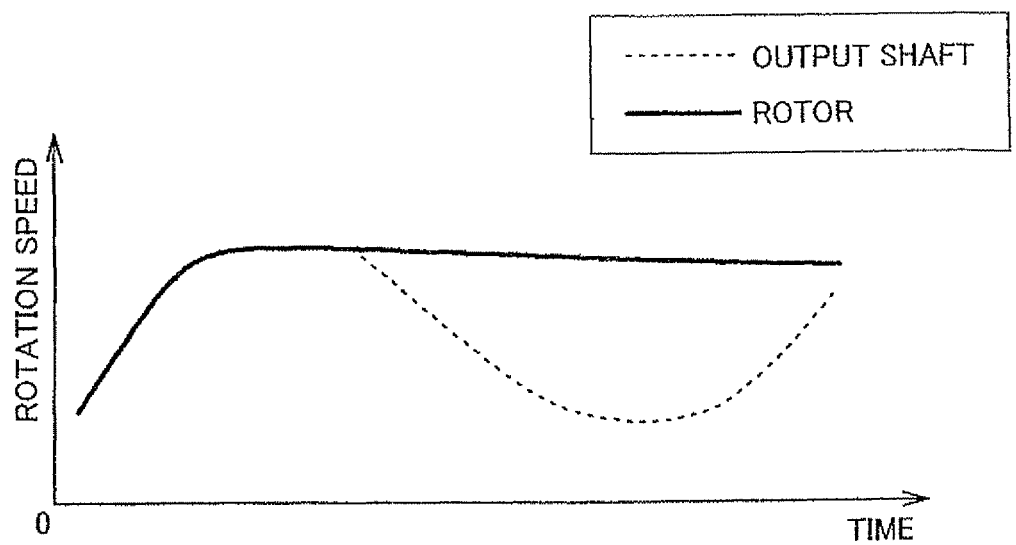
FIG. 12 is a graph that shows rotational fluctuations of the output shaft which is shown in FIG. 10 and a rotor of the generator.

FIG. 12 is a graph that shows rotational fluctuations of the output shaft of the speed up gears 3 and the rotor 42 of the generator 4. As shown in FIG. 12, if the wind force decreases and the rotation speed of the output shaft 35 rapidly decreases, the rotor 42 does not rapidly decreases the rotation speed in association with the output rotor 6 through the drive shaft 41 but continues to rotate with gradual deceleration due to the inertia. Accordingly, in a case where the wind force rapidly fluctuates, the rotational fluctuations of the rotor 42 can be reduced.

The wind power generating device 1 that is constructed as described above produces a similar effect to the wind power generating device 1 of the first and the second embodiments.

In addition, the output rotor 6 is provided with the inertia mass 9 so as to be capable of rotating together, and therefore the inertia moment I of the output rotor 6 can be increased. Accordingly, the one-way clutch 7 releases the connection between the input rotor 5 and the output rotor 6, and when the output rotor 6 rotates with decreased speed due to the inertia of the rotor 42, the angular acceleration ω dot a by the deceleration becomes small. Therefore, the rotation speed of the output rotor 6 can be prevented from rapidly decreasing. That is, even if the wind force decreases and the rotation speed of the main shaft 2 rapidly decreases, the rotor 42 of the generator 4 continues to rotate together with the output rotor 6 by inertia, and therefore average rotation speed of the rotor 42 can be improved effectively. Accordingly, power generation efficiency of the generator 4 can be improved more.

Figure 13:
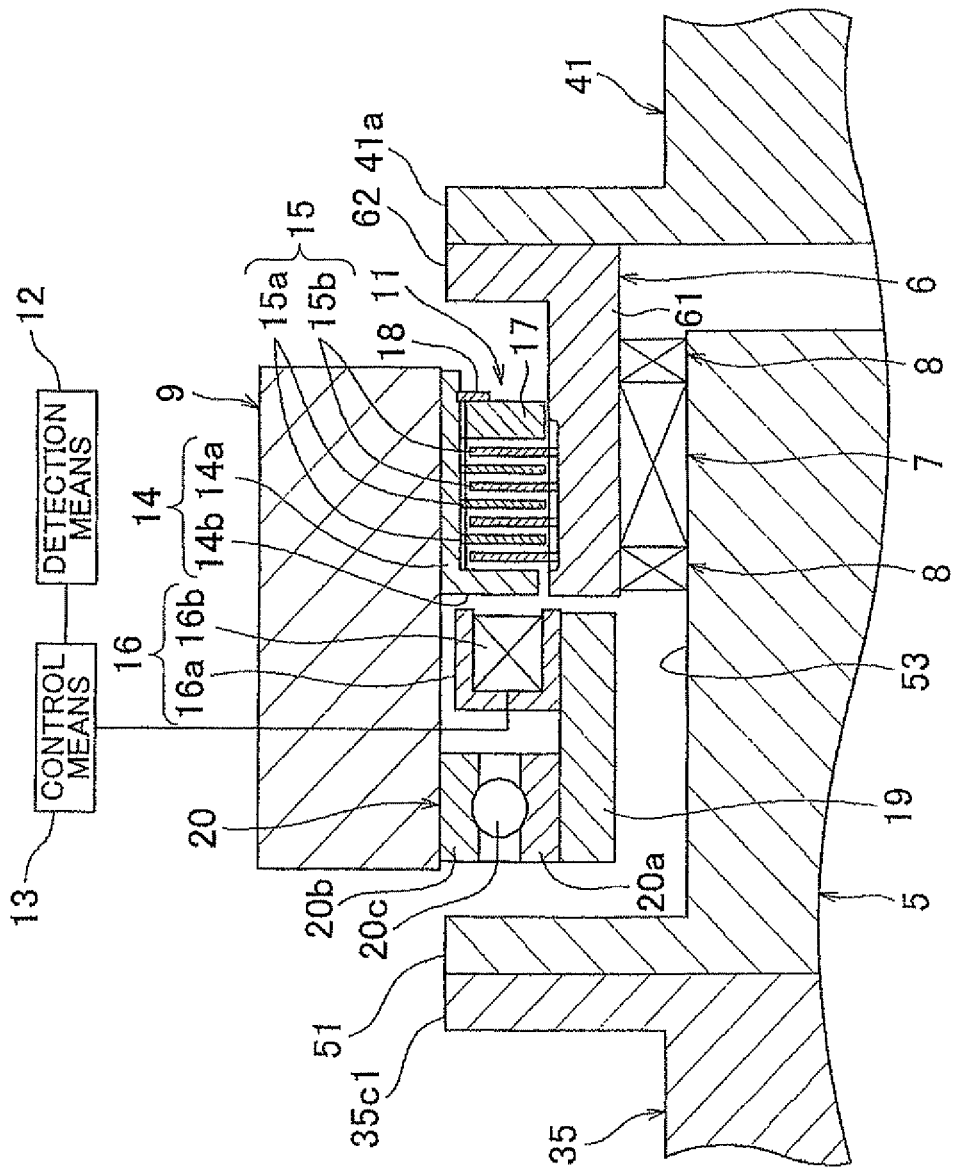
FIG. 13 is a cross-sectional view that shows a connection part between an output shaft of speed up gears and a drive shaft of a generator in a wind power generating device according to a fourth embodiment of the present invention.

FIG. 13 is a cross-sectional view that shows a connection part between an output shaft of speed up gears and a drive shaft of a generator in a wind power generating device according to a fourth embodiment of the present invention. In FIG. 13, the wind power generating device 1 of the present embodiment includes an electromagnetic clutch 11 that connects the output rotor 6 with the inertia mass 9 so as to be capable of rotating together during energization and releases the connection in non-energization, detection means (detection device) 12 that detects the rotation speed of the output rotor 6, and control means (control device) 13 that controls the energization of the electromagnetic clutch 11.

The electromagnetic clutch 11 includes a clutch housing 14 that is disposed between the cylindrical section 61 of the output rotor 6 and the inertia mass 9, a multiple-disc clutch 15 that is disposed between the clutch housing 14 and the cylindrical section 61, an electromagnet 16 that is disposed on one axial side of the multiple-disc clutch 15, and a biasing member 17 that is disposed on another axial side of the multiple-disc clutch 15. The clutch housing 14 has a cylindrical housing body 14a that is fitted and secured in the cylindrical section 61 and an annular section 14b that extends from one axial end of the housing body 14a to a radial inside.

The multiple-disc clutch 15 is constructed such that plural outer clutch discs 15a and plural inner clutch discs 15b are alternatively arranged in the axial direction. The outer clutch discs 15a are mounted in the inner periphery of the housing body 14a through spline fitting to, be movable in the axial direction. In addition, the inner clutch discs 15b are mounted in the outer periphery of the cylindrical section 61 of the output rotor 6 through spline fitting to be movable in the axial direction.

The electromagnet 16 is constructed with a yoke 16a that is formed in a U-shape in cross section and a coil 16b that is held in the yoke 16a. The yoke 16a is fixed to the outer periphery of a cylindrical supporting member 19 that is fixed to the housing of the speed up gears 3. The supporting member 19 is provided with a rolling bearing 20 that supports the inertia mass 9 for rotation. The rolling bearing 20 is formed to be a ball bearing that includes an inner ring 20a which is fitted and secured onto the supporting member 19, an outer ring 20b which is fitted and secured into the inertia mass 9, and plural balls (rolling elements) 20c that are placed between the inner ring 20a and the outer ring 20b so as to be capable of rolling. The rolling bearing 20 is formed to be a ball bearing that uses a ball as a rolling element; however, the rolling bearing 20 may be formed to be a roller bearing that uses a roller as the rolling element.

The biasing member 17 is formed with a magnetic substance and mounted to a right end side of FIG. 13 in the inner periphery of the housing body 14a through spline fitting to be movable in the axial direction. In addition, the biasing member 17 is biased to the side of the flange section 62 of the output rotor 6 by the biasing force of an elastic member (not shown) and held in a non-biasing position shown in FIG. 13 by abutting against a stopper ring 18 that is fixed in the inner periphery of the housing body 14a.

According to the above structure, when the coil 16b of the electromagnet 16 is not energized, the biasing member 17 is held in the non-biasing position by the biasing force of the elastic member. Therefore, the outer clutch discs 15a and the inner clutch discs 15b are not in close contact with each other, or the multiple-disc clutch 15 is in an OFF state, and therefore the connection between the output rotor 6 and the inertia mass 9 is released. When the coil 16b of the electromagnet 16 is energized, the biasing member 17 is attracted to the electromagnet 16 against the biasing force of the elastic member, and therefore the biasing member 17 pushes the outer clutch discs 15a and the inner clutch discs 15b to the side of the annular section 14b of the clutch housing 14. Accordingly, the outer clutch discs 15a and the inner clutch discs 15b come into close contact with each other, or the multiple-disc clutch 15 is in an ON state, and therefore the output rotor 6 and the inertia mass 9 are connected so as to be capable of rotating together.

The detection means 12 detects the rotation speed of the drive shaft 41 of the generator 4 which rotates together with the output rotor 6 in this embodiment in order to detect the rotation speed of the output rotor 6. Specifically, the detection means 12 is constructed with a sensor that is disposed in the vicinity of the drive shaft 41 which protrudes to the right side in the drawing of the rotor 42 of the generator 4 shown in FIG. 9 and detects the rotation speed of the drive shaft 41. The detection means 12 may detect the rotation speed of the rotor 42, the output shaft 35 of the speed up gears 3, or the output rotor 6 itself, other than the drive shaft 41. In addition, the detection means 12 may use a sensor that detects the rotation speed of the drive shaft 41 or the rotor 42 that is incorporated into the generator 4 in order to control the drive of the generator 4.

The control means 13 controls the energization of the coil 16b of the electromagnet 16 when the output rotor 6 starts to rotate. Specifically, the control means 13 controls not to energize the coil 16b in order to release the connection between the output rotor 6 and the inertia mass 9 at startup of the rotation of the output rotor 6. When the detection means 12 detects that the output rotor 6 reaches a specified rotation speed (for example, 300 through 500 rpm) after the startup of the rotation of the output rotor 6, the control means 13 controls to energize the coil 16b in order to connect the output rotor 6 with the inertia mass 9 so as to be capable of rotating together. Other structures of the present embodiment are the same as that of the third embodiment, and therefore the description is not repeated.

According to the wind power generating device 1 that is constructed as described above, the electromagnetic clutch 11 is not energized and the connection between the output rotor 6 and the inertia mass 9 is released until the output rotor 6 reaches the specified rotation speed at the startup of the rotation, and therefore the running torque that is required to rotate the output rotor 6 up to the specified rotation speed can be reduced. Accordingly, time that is required to rotate the rotor 42 up to the specified rotation speed through the output rotor 6 and the drive shaft 41 can be reduced, and therefore the power generation efficiency of the generator 4 can be improved more. When the detection means 12 detects that the output rotor 6 reaches the specified rotation speed after the startup of the rotation of the output rotor 6, the electromagnetic clutch 11 is energized, and the output rotor 6 and the inertia mass 9 are connected so as to be capable of rotating together, and therefore the inertia moment of the output rotor 6 can be increased. Accordingly, when the one-way clutch 7 releases the connection between the input rotor 5 and the output rotor 6, the rotor 42 of the generator 4 does not rapidly decreases the rotation speed in association with the output rotor 6 but continues to rotate by the inertia, and therefore the average rotation speed of the rotor 42 can be increased. Accordingly, power generation efficiency of the generator 4 can be improved more.

Figure 14:
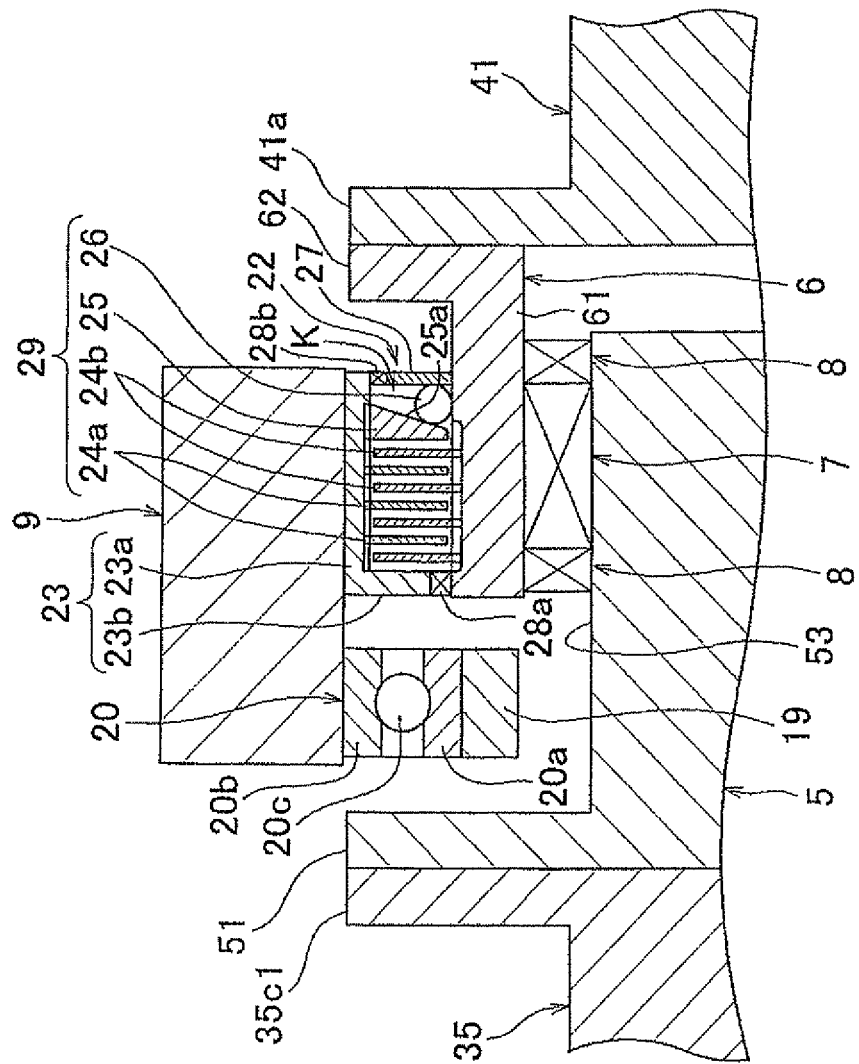
FIG. 14 is a cross-sectional view that shows a connection part between an output shaft of speed up gears and a drive shaft of a generator in a wind power generating device according to a fifth embodiment of the present invention.

FIG. 14 is a cross-sectional view that shows a connection part between an output shaft of speed up gears and a drive shaft of a generator in a wind power generating device according to a fifth embodiment of the present invention. In FIG. 14 the wind power generating device 1 of the present embodiment includes a viscous fluid coupling 22 as an alternative to the electromagnetic clutch 11 of the fourth embodiment. The viscous fluid coupling 22 is disposed between the cylindrical section 61 of the output rotor 6 and the inertia mass 9 and includes a clutch housing 23, plural outer clutch discs 24a, plural inner clutch discs 24b, a biasing member 25, and a ball 26.

The clutch housing 23 has a cylindrical housing body 23a that is fitted and secured in the cylindrical section 61 and an annular section 23b that extends from one axial end of the housing body. 23a to a radial inside. Another axial side of the housing body 23a is covered with a cover member 27 that is formed from an annular plate. Annular seal members 28a and 28b are respectively provided in spacing between the annular section 23b of the clutch housing 23 and the cylindrical section 61 and spacing between the housing body 23a and the cover member 27. An annular sealed space is formed between the housing body 23a and the cylindrical section 61.

A viscous fluid such as silicone oil is filled in the sealed space, and the outer clutch discs 24a and the inner clutch discs 24b are alternatively arranged in the axial direction. The outer clutch discs 24a are mounted in the inner periphery of the housing body 23a through spline fitting to be movable in the axial direction. In addition, the inner clutch discs 24b are mounted in the outer periphery of the cylindrical section 61 of the output rotor 6 through spline fitting to be movable in the axial direction.

The biasing member 25 is mounted to a right end side of FIG. 14 in the inner periphery of the housing body 23a through spline fitting to be movable in the axial direction. One side surface of the biasing member 25 is formed with an inclined surface 25a that is inclined so that thickness of the biasing member 25 in the axial direction gradually increases toward the radial outside. Accordingly, a wedge-shaped space K is formed between the inclined surface 25a of the biasing member 25 and the cover member 27 so as to become narrower toward the radial outside. Plural balls 26 are accommodated in the wedge-shaped space K in the circumferential direction. The biasing member 25 is always biased to the side of the flange section 62 of the output rotor 6 by the biasing force of the elastic member (not shown) and held in a non-biasing position shown in FIG. 14 by abutting against the ball 26. In the present embodiment, a centrifugal clutch mechanism 29 is constructed with the outer clutch discs 24a, the inner clutch discs 24b, the biasing member 25, and the ball 26.

According to the above structure, when the output rotor 6 rotates at low speed during the startup of the rotation, centrifugal force that is applied to the ball 26 of the viscous fluid coupling 22 is small. Therefore, as shown in FIG. 14, the ball 26 is positioned in the radial inside of the wedge-shaped space K, and the biasing member 25 is held in the non-biasing position by the biasing force of the elastic member. Therefore, the outer clutch discs 24a and the inner clutch discs 24b are not in close contact with each other, or the centrifugal clutch mechanism 29 is in an OFF state, and therefore the running torque of the output rotor 6 is transmitted to the inertia mass 9 by viscous drag of the viscous fluid.

In FIG. 14, when the output rotor 6 reaches a specified rotation speed to rotate at high speed, the centrifugal force that is applied to the ball 26 of the viscous fluid coupling 22 becomes large. Therefore, the ball 26 moves to the radial outside of the wedge-shaped space K along the inclined surface 25a of the biasing member 25 by the centrifugal force. In this case, the biasing member 25 is pushed to the side of the annular section 23b of the clutch housing 23 by the ball 26, and therefore the biasing member 25 pushes the outer clutch discs 24a and the inner clutch discs 24b to the side of the annular section 23b against the biasing force of the elastic member. Accordingly, the outer clutch discs 24a and the inner clutch discs 24b come into intimate contact with each other, or the centrifugal clutch mechanism 29 is in an ON state, and therefore the running torque of the output rotor 6 is transmitted to the inertia mass 9 through the centrifugal clutch mechanism 29.

Figure 15:
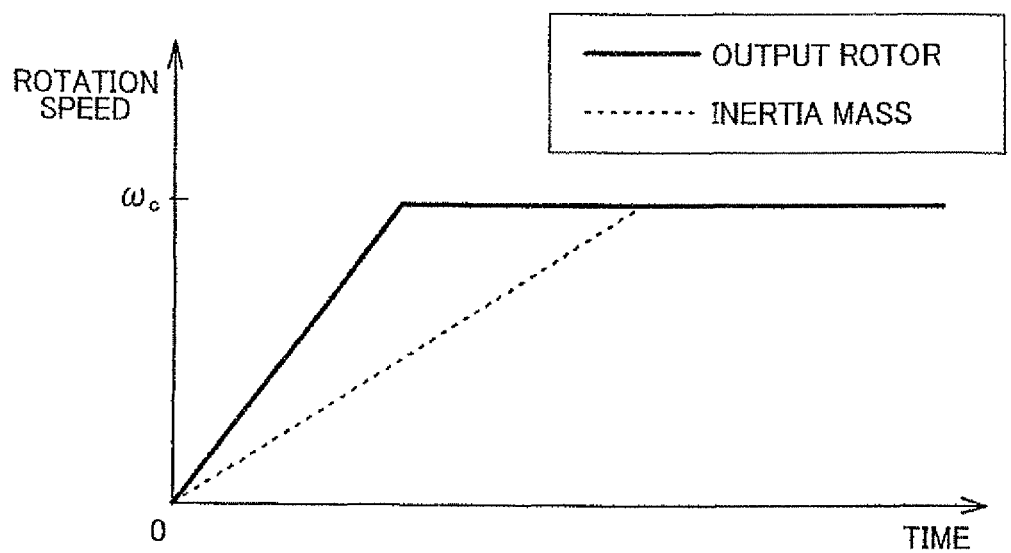
FIG. 15 is a graph that shows rotational fluctuations of an output rotor and an inertia mass in the wind power generating device in FIG. 14.
Figure 16:
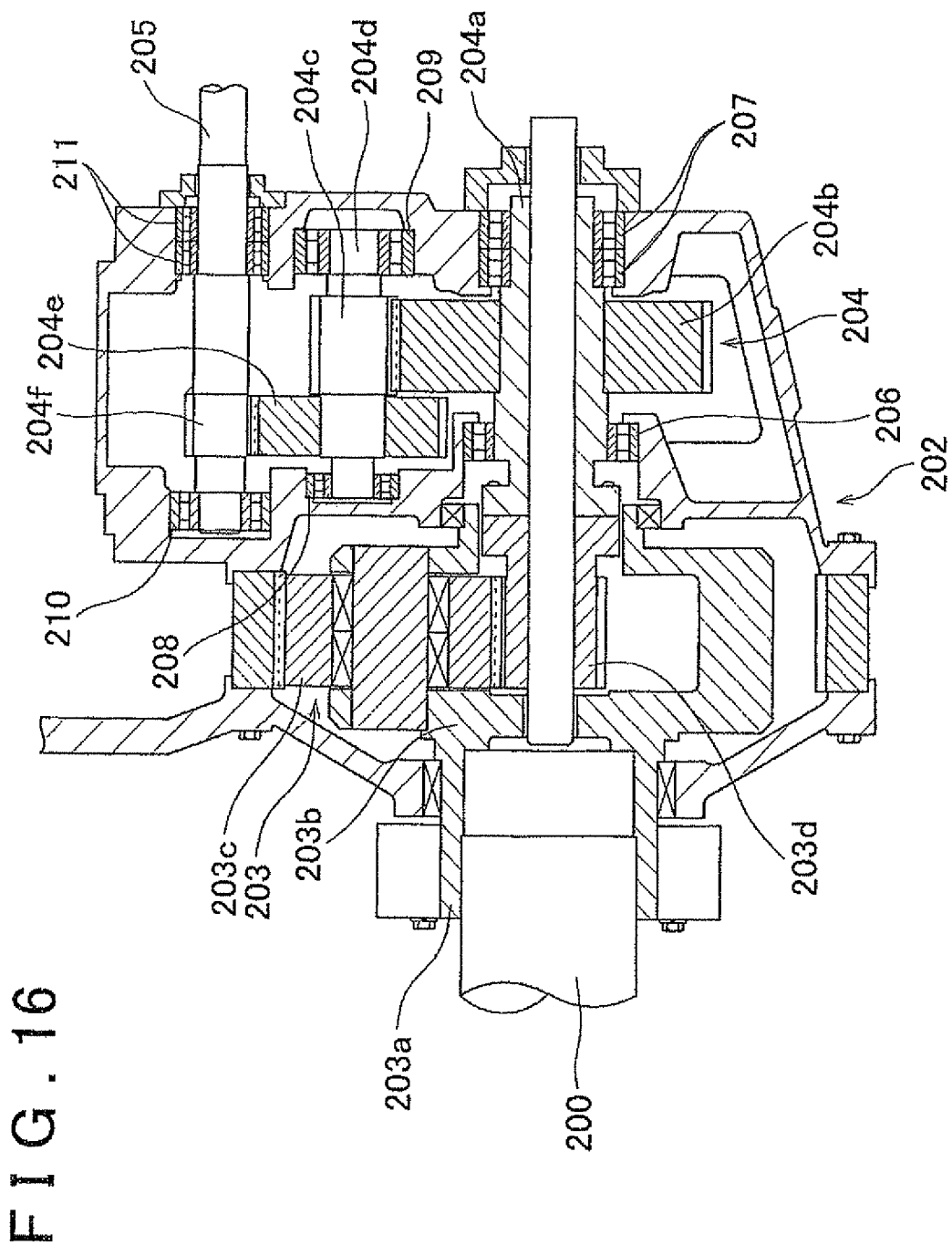
FIG. 16 is a cross-sectional view that shows the speed up gears.

FIG. 15 is a graph that shows rotational fluctuations of the output rotor 6 and the inertia mass 9 of the present embodiment. As shown in FIG. 15, when the output rotor 6 rotates at low speed during the startup of the rotation, or when the running torque of the output rotor 6 is transmitted to the inertia mass 9 by viscous drag of the viscous fluid, the inertia mass 9 increases the speed with lower angular acceleration (slope of a broken line shown in FIG. 15) than the angular acceleration of the output rotor 6 (slope of a continuous line shown in FIG. 15). In addition, when the output rotor 6 reaches the specified rotation speed we to rotate at high speed, or when the running torque of the output rotor 6 is transmitted to the inertia mass 9 through the centrifugal clutch mechanism 29, the inertia mass 9 rotates together with the output rotor 6 with the same rotation speed ωc. Other structures of the present embodiment are the same as that of the third and the fourth embodiments, and therefore the description is not repeated.

According to the wind power generating device 1 that is constructed as described above, when the output rotor 6 rotates at low speed during the startup of the rotation, the running torque of the output rotor 6 is transmitted to the inertia mass 9 by viscous drag of the viscous fluid, and therefore the inertia mass 9 increases the speed with lower angular acceleration than the angular acceleration of the output rotor 6. In other words, inertia torque by the inertia mass 9 which is applied to the output rotor 6 at the startup of the rotation of the output rotor 6 can be reduced, and therefore the running torque that is required to increase the rotation speed of the output rotor 6 up to the specified rotation speed can be reduced. Accordingly, time that is required to increase the rotation speed of the rotor 42 up to the specified rotation speed through the output rotor 6 and the drive shaft 41 can be reduced, and therefore the power generation efficiency of the generator 4 can be improved. In addition, when the output rotor 6 reaches the specified rotation speed to rotate at high speed, the running torque of the output rotor 6 is transmitted to the inertia mass 9 through the centrifugal clutch mechanism 29. Accordingly, the output rotor 6 and the inertia mass 9 are connected so as to be capable of rotating together, and therefore the inertia moment of the output rotor 6 can be increased. Therefore, when the one-way clutch 7 releases the connection between the input rotor 5 and the output rotor 6, the rotor 42 of the generator 4 does not rapidly decreases the rotation speed in association with the output rotor 6 but continues to rotate by the inertia, and therefore the average rotation speed of the rotor 42 can be increased, and the power generation efficiency of the generator 4 can be improved more.

The present invention is not limited to the above embodiments described above and can be changed appropriately to be practiced. For example, in the present embodiment, the input rotor and the output rotor are respectively provided to the output shaft and the drive shaft as separate members; however, the input rotor and the output rotor may integrally be formed with the output shaft and the drive shaft, respectively. The output rotor is arranged on the radial outside of the input rotor; however, the output rotor may be arranged on the radial inside of the input rotor. In this case, the one-way clutch may be formed with the outer ring inner peripheral surface as the cam surface, and the inner ring outer peripheral surface may be formed as the cylindrical surface. Furthermore, in this case, the inner ring outer peripheral surface may be formed in the outer peripheral surface of the output rotor, and the output rotor may be used as the inner ring.

In addition, the output rotor is formed as the outer ring of the one-way clutch and the outer ring of the rolling bearing; however, these outer rings may be provided to the output rotor as separate members. The rolling bearing that is disposed between the input rotor and the output rotor is constructed as the cylindrical roller bearing in order to move the output rotor in the axial direction; however, the roiling bearing may be constructed as a ball bearing in a case where the output rotor is not moved in the axial direction.

The cage of the one-way clutch comes into contact with the inner ring of the rolling bearing; however, the outer ring of the rolling bearing may be provided to the output rotor as a separate member, and the outer ring may come into contact with the cage of the one-way clutch. The power generating device of the present embodiment is exemplified in a case of using wind force as external force; the power generating device of the present embodiment may be applicable to the power generating device that generates electricity by using other external force such as waterpower or thermal power.

In the third embodiment, the inertia mass is provided to the output rotor as a separate member; however, the inertia mass may be integrally framed with the output rotor. In addition, when the output rotor is arranged in the radial inside of the input rotor, the inertia mass may be provided in the axial end of the output rotor so as not to interfere with the one-way clutch or the rolling bearing.

What is claimed is:
1. A power generating device comprising:
  speed up gears including a main shaft that rotates by external force, a rotation transmission mechanism that receives rotation of the main shaft to increase speed of the rotation of the main shaft, and a roller bearing that rotatably supports an output shaft that outputs running torque of the rotation transmission mechanism;
  a generator including a drive shaft which is rotated by receiving rotation of the output shaft and configured to generate electricity in connection with rotation of a rotor which rotates together with the drive shaft;
  an input rotor provided to the output shaft to be capable of rotating together with the output shaft;
  an output rotor provided to the drive shaft to be capable of rotating together with the drive shaft and concentrically arranged on a radial inside or a radial outside of the input rotor;
  a one-way clutch disposed between the input rotor and the output rotor, the one-way clutch being configured to connect the input rotor with the output rotor to rotate together with the input rotor and the output rotor when a rotation speed of the input rotor exceeds a rotation speed of the output rotor, and the one-way clutch being configured to release a connection between the input rotor and the output rotor when the rotation speed of the input rotor falls below the rotation speed of the output rotor; and
  a rolling bearing disposed between the input rotor and the output rotor and configured to support the input rotor and the output rotor so that the input rotor and the output rotor relatively rotate with each other, wherein:
  the one-way clutch includes an outer peripheral surface of an inner ring, an inner peripheral surface of an outer ring, and a roller arranged in each of plural wedge-shaped spaces formed between the outer peripheral surface of the inner ring and the inner peripheral surface of the outer ring,
  the one-way clutch is configured to connect the input rotor with the output rotor to rotate together with the input rotor and the output rotor by engaging the roller with the outer peripheral surface of the inner ring and the inner peripheral surface of the outer ring,
  the one-way clutch is configured to release the connection between the input rotor and the output rotor by disen- gaging engagement of the roller with the outer peripheral surface of the inner ring and the inner peripheral surface of the outer ring, the one-way clutch includes an annular cage configured to hold the plural rollers at specified spacing along a circumferential direction, a pair of the rolling bearings is disposed between the input rotor and the output rotor, the paired rolling bearings are arranged on respective axial sides of the one-way clutch so that each of the paired rolling bearings is adjacent to the one-way clutch and an axial end of each of the paired rolling bearings is capable of coming into contact with a corresponding one of axial end faces of the annular cage of the one-way clutch, the paired rolling bearings are a pair of cylindrical roller bearings that include plural cylindrical rollers and a portion with which end faces of the plural cylindrical rollers in an axial direction come into sliding contact, the axial end faces of the annular cage come into contact with the portion in the pair of the cylindrical roller bearings, the one-way clutch is provided with a torque limiter configured to release the connection between the input rotor and the output rotor when transmission torque from the input rotor to the output rotor exceeds an upper limit, the torque limiter is provided with an accommodating recess that is formed in the outer peripheral surface of the inner ring, and that accommodates the roller separated from the wedge-shaped space, when the transmission torque exceeds the upper limit, to disengage the engagement of the roller with the outer peripheral surface of the inner ring and the inner peripheral surface of the outer ring, a plurality of cam surfaces are formed in the outer peripheral surface of the inner ring, and the accommodating recess is formed in a position between two of the plurality of cam surfaces that are closest to each other in the circumferential direction.

2. The power generating device according to claim 1, wherein the inner peripheral surface of the outer ring of the one-way clutch is a cylindrical surface, the cylindrical roller bearing includes a raceway surface of an outer ring of the cylindrical roller bearing where the cylindrical roller bearing rolls, the output rotor is arranged on a radial outside of the input rotor, and the inner peripheral surface of the outer ring of the one-way clutch and the raceway surface are formed in an inner peripheral surface of the output rotor.

3. The power generating device according to claim 2, wherein the output rotor is removably secured to the drive shaft and arranged to be movable in the axial direction with respect to the input rotor.

4. The power generating device according to claim 1, wherein the outer peripheral surface of the inner ring is provided in the input rotor, and the torque limiter is provided with a separation prevention device that prevents the roller in the accommodating recess from being separated from the accommodating recess by centrifugal force due to rotation of the input rotor.

5. The power generating device according to claim 4, wherein a pocket configured to be capable of accommodating the roller is provided between the outer peripheral surface of the inner ring and the inner peripheral surface of the outer ring, a cage configured to hold the rollers at specified spacing along the circumferential direction and an elastic member configured to bias the roller in the pocket toward a narrowing direction of the wedge-shaped space are provided between the outer peripheral surface of the inner ring and the inner peripheral surface of the outer ring, and the accommodating recess is formed to have a depth in which the roller is positioned in a radial inside with respect to the elastic member.

6. The power generating device according to claim 5, wherein the elastic member is provided with a block member that blocks at least a part of the accommodating recess that accommodates the roller.

7. The power generating device according to claim 4, wherein the separation prevention device is constructed such that a restricting section that restricts the movement of the roller accommodated in the accommodating recess to the radial outside is protruded in an edge of the accommodating recess in the circumferential direction.

8. The power generating device according to claim 7, wherein a pocket configured to be capable of accommodating the roller is provided between the outer peripheral surface of the inner ring and the inner peripheral surface of the outer ring, a cage configured to hold the rollers at specified spacing along the circumferential direction and an elastic member configured to bias the roller in the pocket toward a narrowing direction of the wedge-shaped space are provided between the outer peripheral surface of the inner ring and the inner peripheral surface of the outer ring, and the accommodating recess is formed to have a depth in which the roller is positioned in a radial inside with respect to the elastic member.

9. The power generating device according to claim 8, wherein the elastic member is provided with a block member that blocks at least a part of the accommodating recess that accommodates the roller.

10. The power generating device according to claim 1, further comprising:

an inertia mass provided to be capable of rotating together with the output rotor.

11. The power generating device according to claim 10, wherein the inner peripheral surface of the outer ring of the one-way clutch is a cylindrical surface, the cylindrical roller bearing includes a raceway surface of an outer ring of the cylindrical roller bearing where the cylindrical roller bearing rolls, the output rotor is arranged on a radial outside of the input rotor, and the inner peripheral surface of the outer ring of the one-way clutch and the raceway surface are formed in an inner peripheral surface of the output rotor.

12. The power generating device according to claim 11, wherein the output rotor is removably secured to the drive shaft and arranged to be movable in the axial direction with respect to the input rotor.

13. The power generating device according to claim 10, further comprising:
- an electromagnetic clutch configured to connect the output rotor with the inertia mass so that the output rotor and the inertia mass rotate together during energization and to release the connection between the output rotor and the inertia mass in non-energization;
- a detection device configured to detect the rotation speed of the output rotor; and
- a control device configured to control to put the electromagnetic clutch into non-energization state at startup of rotation of the output rotor and to control to energize the electromagnetic clutch when the detection device detects that the output rotor reaches a specified rotation speed after the startup of the rotation of the output rotor.

14. The power generating device according to claim 10, further comprising:
- a viscous fluid coupling disposed between the output rotor and the inertia mass,
- wherein the viscous fluid coupling includes; i) viscous fluid that transmits a running torque of the output rotor to the inertia mass by viscous drag during low-speed rotation of the output rotor, and ii) a centrifugal clutch mechanism that transmits the running torque of the output rotor to the inertia mass by using centrifugal force in association with high-speed rotation of the output rotor during the high-speed rotation of the output rotor.

* * * * *